US008414381B2

(12) United States Patent
Hein et al.

(10) Patent No.: US 8,414,381 B2
(45) Date of Patent: Apr. 9, 2013

(54) METHOD FOR REMAPPING A GAME WHEEL

(75) Inventors: Marvin A. Hein, Las Vegas, NV (US); Micheal L. Shackelford, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 445 days.

(21) Appl. No.: 11/559,354

(22) Filed: Nov. 13, 2006

(65) Prior Publication Data

US 2007/0069460 A1 Mar. 29, 2007

Related U.S. Application Data

(63) Continuation-in-part of application No. 11/537,471, filed on Sep. 29, 2006, which is a continuation-in-part of application No. 11/428,220, filed on Jun. 30, 2006.

(51) Int. Cl.
*A63F 13/00* (2006.01)

(52) U.S. Cl. ................. 463/21; 463/23; 463/25; 463/29

(58) Field of Classification Search .................... 463/23, 463/42, 16–20, 21, 25, 29
See application file for complete search history.

(56) References Cited

U.S. PATENT DOCUMENTS

| | | | |
|---|---|---|---|
| 3,662,105 A | 5/1972 | Hurst et al. | |
| 4,448,419 A | 5/1984 | Telnaes | |
| 4,676,506 A | 6/1987 | Crouch | |
| 4,718,672 A | 1/1988 | Okada | |
| 4,837,728 A | 6/1989 | Barrie et al. | |
| 4,856,787 A | 8/1989 | Itkis | |
| 5,429,361 A | 7/1995 | Raven et al. | |
| 5,655,961 A | 8/1997 | Acres et al. | |
| 5,702,304 A | 12/1997 | Acres et al. | |
| 5,741,183 A | 4/1998 | Acres et al. | |
| 5,752,882 A | 5/1998 | Acres et al. | |
| 5,759,102 A | 6/1998 | Pease et al. | |
| 5,769,716 A | 6/1998 | Saffari et al. | |
| 5,770,533 A | 6/1998 | Franchi | |
| 5,779,545 A | 7/1998 | Berg et al. | |
| 5,796,389 A | 8/1998 | Bertram et al. | |
| 5,809,482 A | 9/1998 | Strisower | |
| 5,816,918 A | 10/1998 | Kelly et al. | |
| 5,820,459 A | 10/1998 | Acres et al. | |
| 5,833,536 A | 11/1998 | Davids et al. | |
| 5,833,538 A * | 11/1998 | Weiss | 463/21 |

(Continued)

FOREIGN PATENT DOCUMENTS

| | | |
|---|---|---|
| AU | 704691 | 4/1997 |
| DE | 19613455 | 8/1997 |

(Continued)

*Primary Examiner* — Ronald Laneau
*Assistant Examiner* — Ross Williams
(74) *Attorney, Agent, or Firm* — Brooke Quist; Marvin Hein

(57) ABSTRACT

A system and method for remapping a game wheel are disclosed. In one embodiment, a method for remapping a wheel comprises providing a wagering game having a wheel divided into a plurality of wheel segments. A map is selected from a library before producing a game outcome. Each map defines particular weights for the wheel segments on the wheel. Once the map is selected, particular weights are assigned to the wheel segments as defined by the selected map, wherein the particular weights are assigned to the wheel segments before a game outcome is produced.

13 Claims, 11 Drawing Sheets

U.S. PATENT DOCUMENTS

| | | | | |
|---|---|---|---|---|
| 5,833,540 | A | 11/1998 | Miodunski et al. | |
| 5,836,817 | A | 11/1998 | Acres et al. | |
| 5,851,148 | A | 12/1998 | Brune et al. | |
| 5,876,284 | A | 3/1999 | Acres et al. | |
| 5,885,158 | A | 3/1999 | Torango et al. | |
| 5,919,091 | A | 7/1999 | Bell et al. | |
| 5,967,896 | A | 10/1999 | Jorasch et al. | |
| 5,984,779 | A | 11/1999 | Bridgeman et al. | |
| 6,008,784 | A | 12/1999 | Acres et al. | |
| 6,010,404 | A | 1/2000 | Walker et al. | |
| 6,068,552 | A | 5/2000 | Walker et al. | |
| 6,077,163 | A | 6/2000 | Walker et al. | |
| 6,110,041 | A | 8/2000 | Walker et al. | |
| 6,113,495 | A | 9/2000 | Walker et al. | |
| 6,162,121 | A | 12/2000 | Morro et al. | |
| 6,162,122 | A | 12/2000 | Acres et al. | |
| 6,244,958 | B1 | 6/2001 | Acres | |
| 6,254,483 | B1 | 7/2001 | Acres | |
| 6,257,981 | B1 | 7/2001 | Acres et al. | |
| 6,280,328 | B1 | 8/2001 | Holch et al. | |
| 6,302,790 | B1 | 10/2001 | Brossard | |
| 6,312,333 | B1 | 11/2001 | Acres | |
| 6,319,125 | B1 | 11/2001 | Acres | |
| 6,364,768 | B1 | 4/2002 | Acres et al. | |
| 6,371,852 | B1 | 4/2002 | Acres | |
| 6,375,567 | B1 | 4/2002 | Acres | |
| 6,375,569 | B1 | 4/2002 | Acres | |
| 6,431,983 | B2 | 8/2002 | Acres | |
| RE37,885 | E | 10/2002 | Acres | |
| 6,565,434 | B1 | 5/2003 | Acres | |
| 6,607,441 | B1 | 8/2003 | Acres | |
| 6,652,378 | B2 | 11/2003 | Cannon et al. | |
| 6,676,510 | B1 * | 1/2004 | Bittman et al. | 463/20 |
| 6,712,697 | B2 | 3/2004 | Acres | |
| 6,712,698 | B2 | 3/2004 | Paulsen et al. | |
| 6,722,985 | B2 | 4/2004 | Criss-Puszkiewicz | |
| 6,800,030 | B2 | 10/2004 | Acres | |
| 6,832,958 | B2 | 12/2004 | Acres et al. | |
| 6,910,964 | B2 | 6/2005 | Acres | |
| RE38,812 | E | 10/2005 | Acres et al. | |
| D531,333 | S | 10/2006 | Acres et al. | |
| 7,601,061 | B2 * | 10/2009 | Jackson | 463/20 |
| 2003/0060247 | A1 | 3/2003 | Goldberg et al. | |
| 2004/0002383 | A1 | 1/2004 | Lundy et al. | |
| 2004/0142750 | A1 | 7/2004 | Glisson et al. | |
| 2005/0075159 | A1 | 4/2005 | Kaminkow | |
| 2005/0124405 | A1 | 6/2005 | Nordman | |
| 2006/0079310 | A1 * | 4/2006 | Friedman et al. | 463/16 |
| 2007/0060246 | A1 * | 3/2007 | Baerlocher et al. | 463/16 |

FOREIGN PATENT DOCUMENTS

| | | | |
|---|---|---|---|
| EP | 0769769 | A1 | 4/1997 |
| EP | 1082979 | | 3/2001 |
| EP | 1260928 | | 11/2002 |
| GB | 2393020 | | 3/2004 |
| WO | 2004/024260 | | 3/2004 |
| WO | 2004022181 | | 3/2004 |

* cited by examiner

METHOD FOR REMAPPING A GAME WHEEL

CROSS-REFERENCE TO RELATED APPLICATIONS

The present application (application Ser. No. 11/559,354) is a continuation-in-part of U.S. patent application No. 11/537,471, filed Sep. 29, 2006, which is a continuation-in-part of U.S. patent application Ser. No. 11/428,220, filed Jun. 30, 2006, both of which are herein incorporated by reference in their entirety. application Ser. No. 11/559,354 is related to U.S. patent application Ser. No. 11/456,541 filed Jul. 10, 2006, entitled UNIVERSAL GAME MONITORING UNIT AND SYSTEM, which is a continuation-in-part of U.S. patent application Ser. No. 10/943,771 filed Sep. 16, 2004, entitled USER INTERFACE SYSTEM AND METHOD FOR A GAMING MACHINE, and which is also a continuation-in-part of U.S. patent application Ser. No. 09/746,854 filed Dec. 22, 2000, entitled GENERIC DEVICE CONTROLLER UNIT AND METHOD, which claims priority to U.S. Provisional Patent Application Ser. No. 60/174,192, filed Dec. 30, 1999, entitled UNIVERSAL INTERFACE STANDARDS TRANSLATOR SYSTEM FOR PROCESS CONTROL DEVICES, all of which are herein incorporated by reference in their entirety. application Ser. No. 11/559,354 is related to U.S. Provisional Patent Application Ser. No. 60/714,754 filed Sep. 7, 2005, entitled SYSTEM GAMING APPARATUS AND METHOD, which is hereby incorporated herein by reference in its entirety. application Ser. No. 11/559,354 is related to co-pending U.S. patent application Ser. No. 11/559,339 filed Nov. 13, 2006, entitled REMAPPABLE GAME WHEEL.

BACKGROUND

Various types of gaming machines have been developed with different features to captivate and maintain player interest. For example, gaming machines may include flashing displays, lighted displays, or sound effects to capture a player's interest in a gaming device.

Another important feature of maintaining player interest in a gaming machine includes providing the player with many opportunities to win awards, such as cash rewards or prizes. For example, in some slot machines, the display windows show more than one adjacent symbol on each reel, thereby allowing for multiple-row betting. Other types of slot machines have been developed that offer second-chance or bonus games that provide players with additional opportunities to win, such as with a bonus wheel. Furthermore, some gaming machines offer a player the opportunity to win millions of dollars by providing progressive jackpots.

Some gaming machines include a wheel style game to captivate player interest. However, after a short period of time, players, generally, understand that the average pay of the wheel will be low. What is needed is a system and method for introducing variety into the operation of a game wheel. Additionally, there remains a need for a remappable wheel that provides a player with enhanced excitement and increased opportunity of winning.

BRIEF SUMMARY

Briefly, and in general terms, various embodiments are directed to a system and method for remapping a game wheel. One embodiment is directed to a method for remapping a wheel. The method comprises providing a wagering game having a wheel divided into a plurality of wheel segments. A map is selected from a library before producing a game outcome, wherein each map defines particular weights for the wheel segments on the game wheel. Once a map is selected, the particular weights are assigned to the wheel segments as defined by the selected map.

Other features and advantages will become apparent from the following detailed description, taken in conjunction with the accompanying drawings, which illustrate by way of example, the features of the various embodiments.

DETAILED DESCRIPTION

Figure 1:
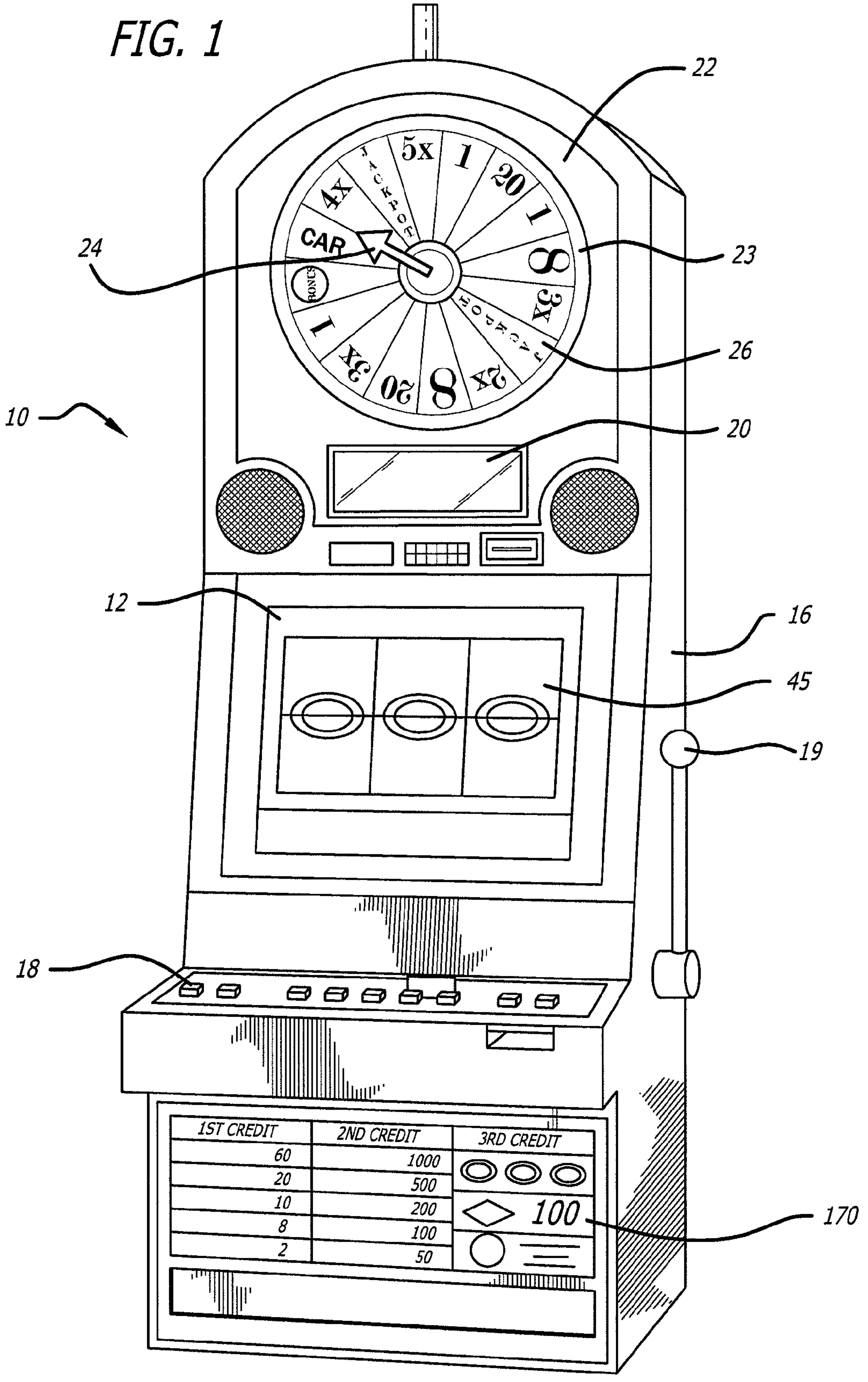
FIG. 1 illustrates an embodiment of a gaming machine comprising multiple primary games.

Various embodiments disclosed herein are directed to a system and method for remapping a game wheel. Embodiments of the system and method are illustrated and described herein by way of example only and not by way of limitation.

Referring now to the drawings, wherein like reference numerals denote like or corresponding parts throughout the drawings and, more particularly to FIGS. 1-12*b*, there are shown various embodiments of systems and methods capable of remapping a game wheel.

Figure 10:
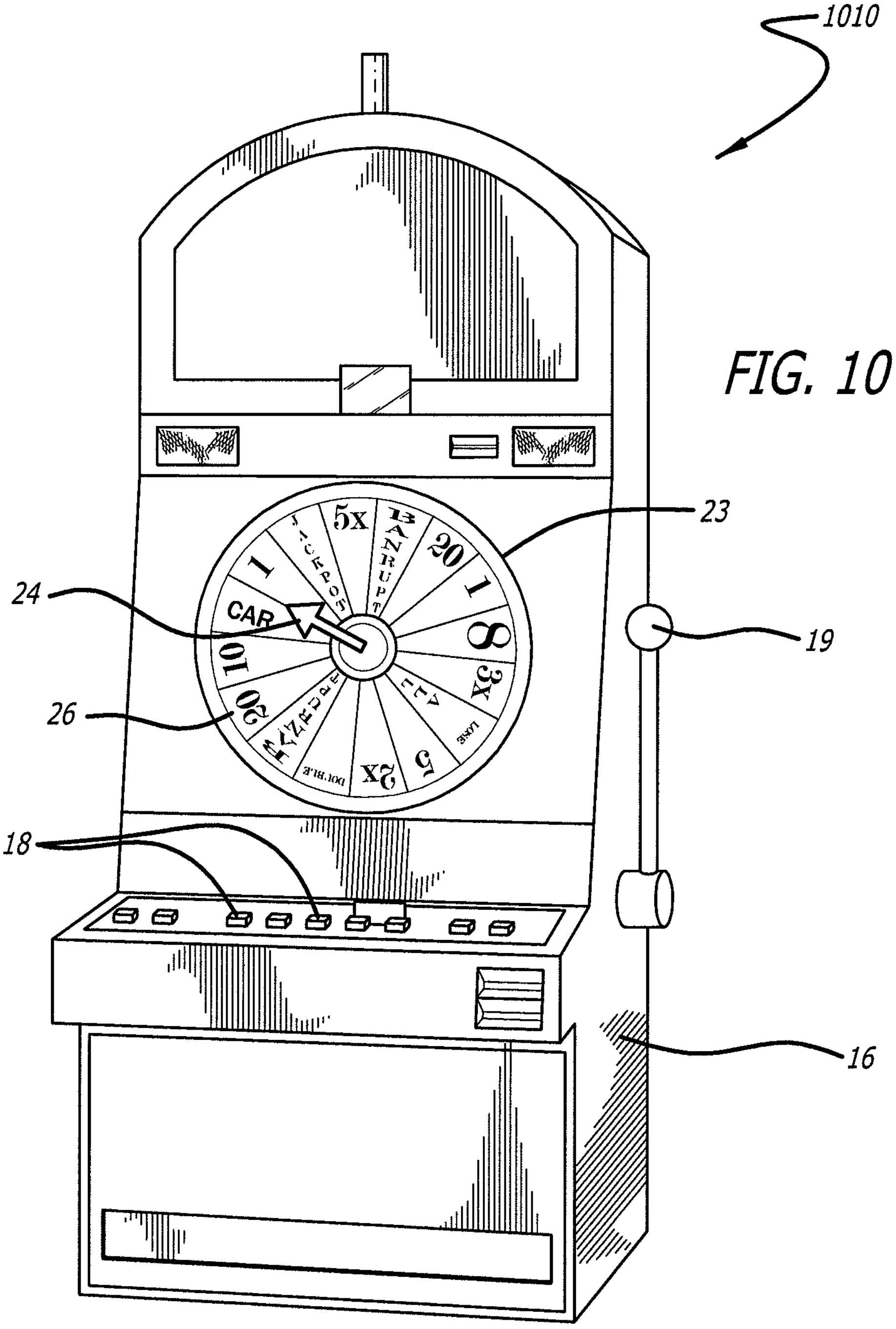
FIG. 10 illustrates an embodiment of a gaming machine comprising a remappable game wheel.

Referring to FIG. 10, a gaming machine 1010 having a wheel 23 is shown. In one embodiment, the wheel 23 is a fixed illustration of a wheel divided into various wheel segments 26 (also referred to as payout indicators) on the face thereof. Various values are identified on the wheel segments 26, e.g., "10", "20", "BANKRUPT," etc. Optionally, in another embodiment, the wheel segments 26 are color-coded (not shown) in lieu of having values displayed on the segments. In this embodiment, each color corresponds to a particular prize or award.

In FIG. 10, a pointer 24 is located in proximity to the wheel 23 so as to rotate about the illustration of the wheel 23. During play, the pointer 24 moves in a circular motion around the stationary wheel 23 and eventually comes to a stop near a wheel segment 26, thereby indicating a payout on the wheel 23 which the player has won. Optionally, in an alternate embodiment, the pointer 24 is fixed and the wheel 23 spins or rotates.

Additionally, in another embodiment (not shown) a lighting mechanism is used to indicate a game outcome rather than a pointing mechanism. Lighting effects may be utilized to simulate movement around the wheel 23. A lighted wheel segment may indicate the game outcome and the payout award.

Figure 9:
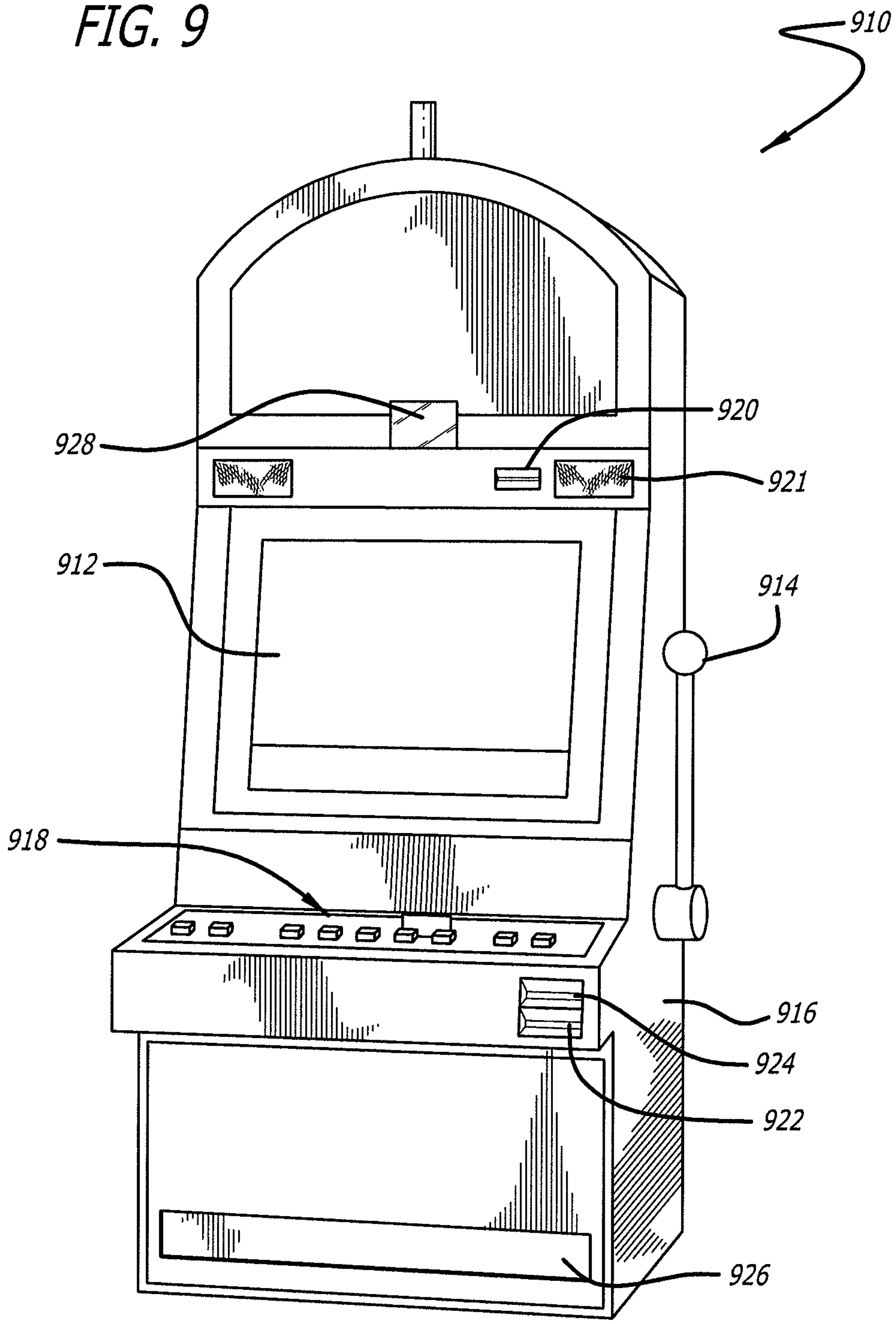
FIG. 9 illustrates an embodiment of a gaming machine comprising a single game display.

Those skilled in the art will appreciate that the wheel 23 may be a mechanical wheel, electromechanical wheel, a video representation of a wheel, or any other form known for presenting a wheel to a player. In FIG. 9, a gaming machine 910 having a game display 912 is shown. In one embodiment, the game display 912 is a video display such as, but not limited to CRTs (cathode ray tubes), or thin-panel displays. Examples of thin-panel displays include plasma, LCD (liquid crystal display), electroluminescent (EL), vacuum florescent, filled emission, or any other types of thin panel displays known or developed in the art. Additionally, the video picture may be presented in either a portrait or landscape orientation and utilize standard or widescreen dimensions. In one embodiment, the video game display 912 of gaming machine 910 presents a video representation of a wheel (not shown). In another embodiment, the video game display 912 is capable of presenting a wheel of any size, having any number of wheel segments. The presented wheel may incorporate any type of indicia, symbols or prize values thereon. Additionally, various color schemes may be used to represent award values. Optionally, the video game display 912 on the gaming machine 910 may present two or more wheels at the same time. Additionally, one or more of the presented wheels may be a remappable wheel.

Referring back to FIG. 10, the gaming machine 1010 further includes a cabinet 1016. The cabinet 1016 is a self-standing unit that is generally rectangular in shape. In other embodiments, the cabinet (not shown) may be a slant-top, bar-top, or table-top style cabinet. However, any shaped cabinet may be used with any embodiment of the gaming machine 1010 and sized for a player to be able to sit or stand while playing a game. Additionally, the cabinet 16 may be manufactured with reinforced steel or other rigid materials that are resistant to tampering and vandalism. Optionally, in an alternate embodiment, the gaming machine 1010 may instead be a cinema-style gaming machine (not shown), as disclosed in U.S. application Ser. No. 11/225,827, entitled "Ergonomic Gaming Cabinet," filed on Sep. 12, 2005, which is hereby incorporated by reference.

In one embodiment, the cabinet 16 shown in FIG. 10 houses a game management unit (not shown) that includes a processor, circuitry, and software for receiving signals from the player-activated buttons 18 and a handle 19, operating the games, and transmitting signals to the respective displays and speakers 21.

Figure 11:
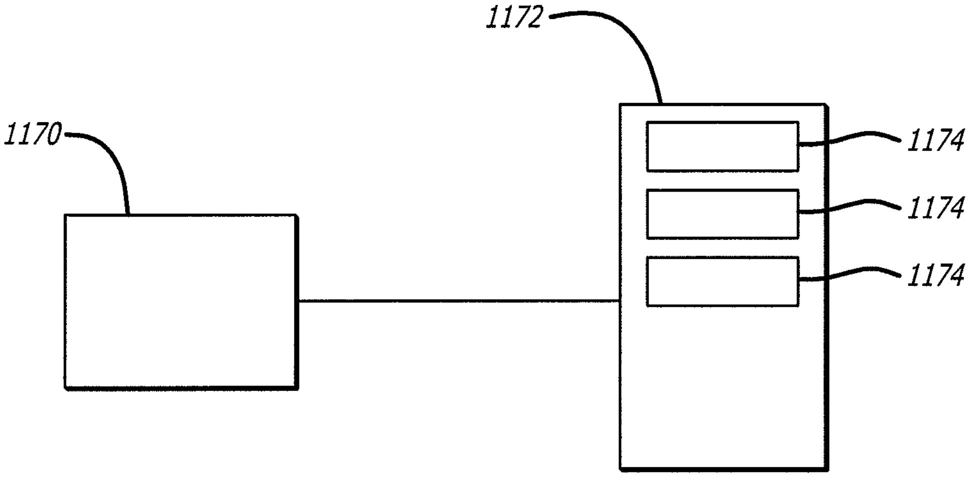
FIG. 11 illustrates an embodiment of a library of maps for use with a remappable game wheel.

In one embodiment, the wheel 23 is a remappable wheel and multiple maps are utilized to change the weights assigned to the wheel segments 26. The weight assigned to a wheel segment 26 represents the probability of that wheel segment being selected as the game outcome. More particularly, the weights assigned to the wheel segments 26 may vary according to the particular map applied to the wheel 23. Referring to FIG. 11, a library 1172 includes two or more maps 1174. Each map 1174 defines a weighting scheme for the wheel 23 such that the wheel segments 26 on the wheel 23 are assigned a particular weight. In one embodiment, a particular map 1174 assigns each wheel segment 26 on the wheel 23 a unique weight, so that no two wheel segments 26 have the same weight. Optionally, in another embodiment, a particular map 1174 assigns various weights to the wheel 23, such that one or more wheel segments 26 have the same weight. Alternately, in an option embodiment, a particular map 1174 assigns the same weight to each wheel segment 26. Those skilled in the art will appreciate that the library 1172 may include any number of maps.

In one embodiment, a particular map 1174 defines a weight for each wheel segment 26 on the wheel 23. Optionally, in an alternate embodiment, a particular map 1174 defines a weight for only some of the wheel segments 26 on the wheel 23. In one scenario, a wheel segment 26 not having an assigned weight is considered to have a default weight value. In one embodiment, the default weight value is zero. Alternately, in an optional embodiment, not all of the wheel segments 26 on the wheel 23 are used during game play. The wheel segments 26 that are used are also referred to as playable wheel segments. In this scenario, a particular map 1174 defines weights for only one or more playable wheel segments 26.

In an alternate embodiment, the number of wheel segments appearing on a wheel 23 may vary. For example, in a game utilizing a video display to present a video representation of a wheel 23, the number of wheel segments is capable of varying from zero to an infinite number of wheel segments. Realistically, the maximum number of wheel segments actually displayed depends on the maximum number of segments that may be easily viewable for a player on the wheel 23. Additionally, in a mechanical-type wheel, lighting effects, such as black lighting, may be utilized to make the wheel appear to have more or less wheel segments. For example, in one embodiment, only a select number of wheel segments are lit, and only the lit wheel segments are used during game play. In another embodiment, the particular map 1174 that is applied to the wheel, determines the number of wheel segments 26 displayed on the wheel 23 and the weight assigned to each of the displayed wheel segments.

Optionally, in another embodiment, lighting effects, such as, but not limited to, back lighting may be used to change the appearance of the indicia or symbols located on the wheel segments 26. For example, various lighting techniques may be applied to characters on a wheel so that a character set "200" sometimes appears as "20" and sometimes appears as "200." Specifically, during one play, lighting is utilized so that the last "0" in "200" is not visible, thus making the wheel segment appear to display "20" rather than "200." During a different play of the wheel 23, lighting is utilized so all digits in "200" are visible on a wheel segment 26. Optionally, during yet a different play of the wheel 23, the same character set may appear as "2", "0", or "00". Similarly, in another example embodiment, lighting is utilized to vary the appearance of a set of indicia that includes a multiplier. For example, the characters set "3X" may appear to the human eye as "3X" or optionally, lighting may be used so that the same characters set appears solely as a "3." Those skilled in the art will appreciate that a variety of lighting effects may be utilized to produce infinite possibilities of indicia combinations. Various other lighting techniques for use with indicia sets are described in U.S. application Ser. No. 11/558,827, entitled, "Gaming Machine And Method Having A Visually Alterable Indicia Set" filed on Nov. 10, 2006, which is hereby incorporated by reference.

In FIG. 11, a processor 1170 is operably connected to a library 1172. The processor 1170 accesses the library 1172 to select a particular map 1174. The processor 1170 applies the weighting scheme defined by the selected map to assign a weight to one or more wheel segments 26 on a game wheel 23. In one embodiment, a particular map 1174 may define weights for all of the wheel segments 26 on a wheel 23. Optionally, in another embodiment, a particular map 1174 will define weights for only some of the wheel segments 26 on a wheel 23.

In various embodiments, the library 1172 is stored in a memory device (not shown). By way of example, but not by limitation, such memory devices include external memory devices, hard drives, CD-ROMs, DVDs, and flash memory cards. In one embodiment, the memory device (not shown) is housed within a gaming machine 1010. In an alternative embodiment, the library 1172 is stored in a remote storage device. In one embodiment, the remote storage device is housed in a remote server. The processor 1170 may access the remote storage device via a network connection, including but not limited to, a local area network connection, a TCP/IP connection, a wireless connection, or any other means for operatively networking components together. Optionally, the memory device may include other data such as graphics, sound files and other media information for use with a wagering game.

The selection of a particular map 1174 from the library 1172 may be influenced by many factors. In one embodiment, the map is randomly selected. A device such as a random number generator may be used to implement the random selection of a map 1174 from the library 1172. Optionally, in another embodiment, factors such as wager amount, player information, player history, the number of accrued player points, and game play results from a separate game may determine which map 1174 is selected from the library 1172.

More particularly, in one example embodiment, the amount of the wager or placed bet determines which map is selected. In this example, wager amounts are organized into three levels. The level determines which map is selected and applied to the wheel 23. For example, in one example scenario, wagers placed in the range of five cents to ten cents are categorized as a first level type of wager. Additionally quarter wagers may be categorized as the second level, and dollar wagers may be categorized as the third level.

Once a player places his bet, the amount of the wager (or bet) is evaluated to determine the appropriate level. If, in this example, the player bets ten cents, the wager amount corresponds to the first level type of wager, and the map associated with the first level would be selected and used to define the applicable wheel weights for that wager.

In one embodiment, the first level is associated with a map have lower wheel weights. More particularly, this means the larger prize values displayed on the wheel segments will receive low weights, and the smaller prize values will receive higher weights, thereby making it statistically more likely a game outcome will result in a smaller prize award for what is considered a low bet. Similarly, under the same scenario described above, a dollar wager is associated with a map having higher weights on the large prizes. In other words, the higher the bet level, the more likely it is the game outcome will result in a larger prize value.

Additionally, in another embodiment, maximum wager amounts, or max bets, may be privy to more favorable maps (e.g., a map having higher weights for the segments with large prize amounts). Optionally, wagers may be categorized based on the number of credits bet, in combination with the monetary amount of the wager. Alternately, wagers may be categorized into levels based solely on the number of credits bet. It should be appreciated that the above examples are intended to be illustrative and should not be construed as limiting in any way. Those skilled in the art will appreciate that wager amounts may be categorized into a variety of levels.

In another embodiment, the map selection is influenced by player information. For example, a library may comprise an unlimited number of maps. However, not all maps may be applicable to all players. For example, for a rated player, also sometimes called a V.I.P. player or high roller, any of the maps may be applied to the wheel during his gaming sessions. Optionally, for a casual player, or one who historically places low bet amounts, only a limited number of maps may be applied to the wheel during his gaming sessions. Alternately, information based on a player's rate of play (i.e., the number of games played per specified period of time) may also be used to determine the particular map selected for a game.

Additionally, player information such as birthdays or anniversaries may be factors considered during the map selection. On special occasions, such as birthdays, a particular map may be applied to a player's game. In one embodiment, a more favorable map may be selected during game play for a player on his birthday.

Optionally, the player information may be obtained from a player identification device. For example, in one embodiment, the player identification device is a player card. The player inserts the player card into a card reader connected to the gaming machine and player information is read from the player card. In an alternate embodiment, player information is obtained when the player swipes the card in front of a card reader. Optionally, in another embodiment, the player identification device utilizes RFID and player information is transmitted to a receiving device.

In one embodiment, the wheel 23 is remapped for every game. For example, every time a player places a bet, a remapping session is activated. The processor 1170 selects a map 1174 and assigns the weights as defined by the selected map. If another game is initiated, the processor 1170 will again access the library 172 and select a particular map. The processor 1170 does not necessarily select a different map every time. In one embodiment, the processor may select and apply the same map for consecutive games.

In one embodiment, each map 1174 corresponds to one or more particular games, or modes of operation. For example, a gaming machine 1010 may have one wheel 23, but may offer two types of games for play on the same wheel 23. In one embodiment, the gaming machine 1010 includes a first game, referred to as the 'red game' and a second game, referred to as the 'blue' game. The red game and blue game are played using the same wheel 23. In one example embodiment, the blue game is played more often than the red game. In this example scenario, for the blue game, the weights on the top paying segments would be low. For the red game, the weights on the top paying segments would be higher. Additionally, in one embodiment, progressive pays may be more likely for the red game than for the blue game.

Optionally, various techniques may be utilized to enable the player to recognize which game is being played and/or which map is being applied. This gives the player incentive to increase his bet in order to obtain a more favorable map. In one embodiment, lighting effects (not shown) may be used to assist the player in distinguishing between the blue and red game, and thereby enabling the player to recognize which game is being played. For example, the wheel 23 may turn the color red when the red game is in play. Similarly, the wheel 23 may turn the color blue when the blue game is in play. Additionally, pay glass or help screens may be used to describe the advantages/disadvantages of each colored game. In another embodiment, the wheel segments may appear to look different for various games. In one embodiment back-lighting may be utilized to change the appearance of indicia on the wheel segments 26 during play of the different games. For example, using filtering techniques, a symbol on a wheel segment 26 would show one particular pay value during the blue game when a blue backlight is applied, and the same wheel segment 26 would show a different pay value during the red game when a red backlight is applied. Alternately, in another embodiment, black lighting is used to actually change the appearance of a symbol on one or more wheel segments (also referred to as payout segments).

Figure 12:
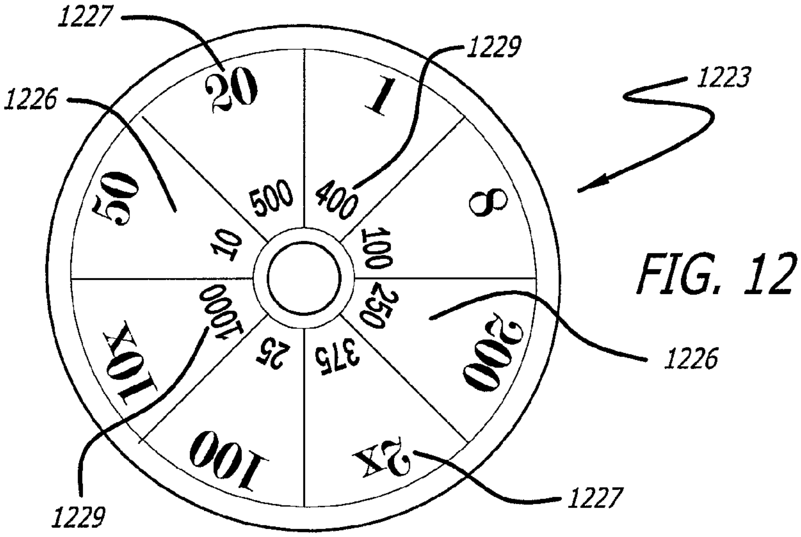
FIG. 12 illustrates an embodiment of a game wheel having multiple sets of indicia.
Figure 12A:
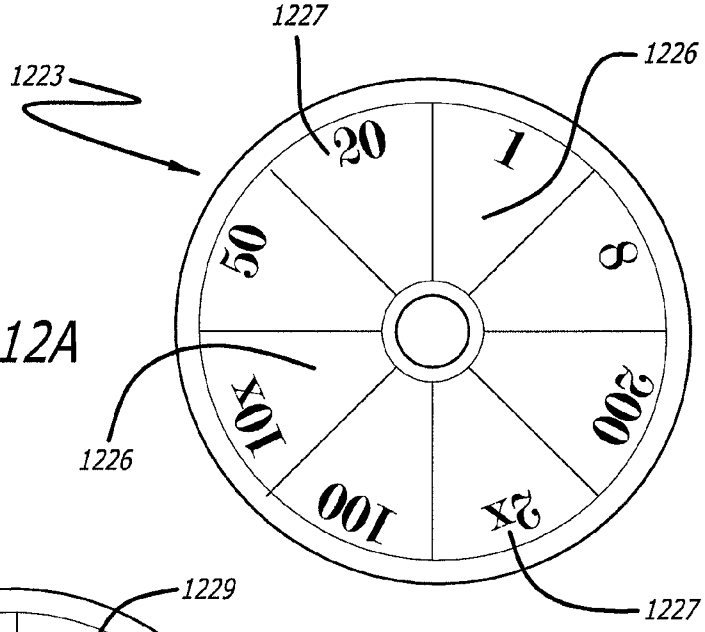
FIG. 12*a* illustrates an embodiment of a game wheel displaying a first set of available indicia.
Figure 12B:
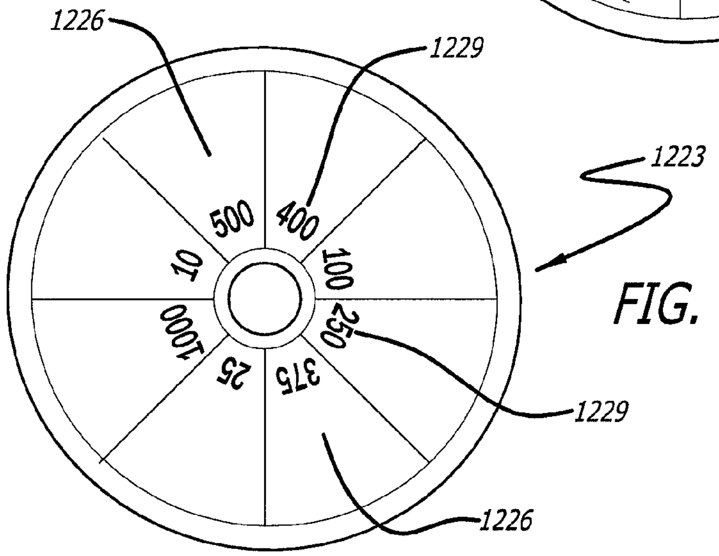
FIG. 12*b* illustrates an embodiment of a game wheel displaying a second set of available sets of indicia.

Optionally, in another embodiment, having a red game and a blue game, each payout segment comprises two sets of indicia. Referring to FIG. 12, a wheel 1223 having two sets of indicia on each wheel segment 1226 is shown. A first set of indicia 1227 is located around the outer parameter of the wheel 1223, and a second set of indicia 1229 is located around the inner parameter of the wheel 1223. In one example embodiment, when a blue game is in play, only the first set of indicia 1227 is visible on the wheel segments 1226. For example, referring to FIG. 12A, only the first set of indicia 1227 is visible on the wheel 1223. The first set of indicia 1227 could be blue symbols that are lit, and the second set of indicia (not shown) could be darkened so they are not visible, as illustrated in FIG. 12A. When the red game is in play, a different set of indicia is visible. Referring to FIG. 12B, only the second set of indicia 1229 is visible. For example, the second set of indicia 1229 could be red symbols that are lit, and the first set of indicia 1227 are darkened during play of the red game. Optionally any number of multiple sets of indicia may be used on a wheel 1223. For example, in one embodiment, the wheel 1223 may include three different sets of indicia (not shown).

In one embodiment, the amount of the wager determines whether the red game or the blue game is played. For example, quarter bets may trigger the play of the red game and dollar bets may trigger the play of the blue game. Additionally, ten-dollar bets may enable either game to be played. Once the bet is placed, and the game is selected, the wheel 1223 reflects the particular selected game. Those skilled in the art will appreciate that a casino or game maker may pre-define the particular bet amounts that correspond to specific games.

Additionally, in an optional embodiment, three games are associated with the wheel 23. For example, a red game, a white game and a blue game may all utilize the same wheel during game play. Alternately, any number of games may be associated with the wheel 23.

Referring back to FIG. 10, in one embodiment, the remappable wheel 23 is used in a bonus game. Alternately, the wheel 23 may be used in a primary game and/or a secondary game. Additionally, in an alternate embodiment, the wheel 23 may be used in combination with a primary game and a secondary game. As those skilled in the art will appreciate the remappable wheel 23 may be utilized in any type of game.

In another embodiment, a gaming machine provides multiple games for play. The remappable wheel described above may be used in this type of gaming machine. For example, referring to FIG. 1, a gaming machine 10 having two game displays is shown, wherein a particular game is presented in each display. More particularly, the gaming machine 10 includes a first primary game display 12 and a second primary game display 22. In one embodiment, the game wheel 23 presented on the gaming machine 10 is a remappable wheel.

Optionally, in another embodiment, the gaming machine 10 provides multiple primary games for play. The first primary game display 12 and the second primary game display 22 present one or more games of chance such as, but not limited to, mechanical slots, video slots, video poker, video blackjack, video keno, roulette, Class II bingo, craps, a mechanical wheel game or video representation of a wheel game. In alternate embodiments, it may further be appreciated that games of skill or games of chance involving some player skill may be presented in the first primary game display 12. Additionally, any of the wheel games presented may be remappable wheels.

In one embodiment the second primary game display 22 presents a game of chance different from the game presented in the first primary game display 12. In an alternative embodiment, the second primary game display 22 presents the same game as the one displayed in the first primary game display 12.

Optionally, in one embodiment, the first primary game display 12 is a video display such as, but not limited to, CRTs (cathode ray tubes), or thin-panel displays. Examples of thin-panel displays include plasma, LCD (liquid crystal display), electroluminescent (EL), vacuum florescent, filled emission, or any other types of thin panel displays known or developed in the art. Additionally, the video picture may be presented in either a portrait or landscape orientation and utilize standard or widescreen dimensions. Optionally in an alternate embodiment, the second primary game display 22 is also a video display. In other embodiments, only one of the game displays 12 and 22 is a video display. Additionally, in another embodiment, at least one of the first primary game display 12 and the second primary game display 22 may also include a conventional touch-screen or touch-glass system (not shown).

Additionally, more than one game may be shown or played simultaneously, substantially simultaneously or sequentially, on one of the game displays 12, 22, such as four hands of blackjack. In one embodiment, second primary game display 22 presents a game of chance different from the game presented in or on first primary game display 12. In an alternative embodiment, second primary game display 22 presents the same game as the one displayed in first primary game display 12. In another embodiment, game displays 12, 22 are linked together for simultaneous or coordinated play of one or more games.

The gaming machine 10 further includes a cabinet 16. As those skilled in the art will appreciate any shaped cabinet may be used, the cabinet 16 is a self-standing unit that is generally rectangular in shape, but may also be a slant-top, bar-top, or table-top style cabinet. However, any shaped cabinet may be used with any embodiment of the gaming machine 10 and sized for a player to be able to sit or stand while playing a game. Optionally, in an alternate embodiment, the gaming machine 10 may instead be a cinema-style gaming machine (not shown), as previously described above.

In one embodiment, the cabinet 16 shown in FIG. 1 houses a game management unit (not shown) that includes a processor, circuitry, and software for receiving signals from the player-activated buttons 18 and a handle 19, operating the games, and transmitting signals to the respective displays and speakers 21.

The gaming machine 10 includes a plurality of player-activated buttons 18. These buttons 18 may be used for various functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may be "pulled" by a player to initiate a game.

In optional embodiments, the buttons 18 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference.

Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of pay lines to play in a game and the number of credits to bet per line.

Alternately, in an optional embodiment, the gaming machine 10 includes a video display 20 for presenting information such as, but not limited to, game related information, player information, advertisements and casino promotions, graphic displays, news and sports updates, or even offer another game. This information may be generated through a host computer networked with the gaming machine 10 on its own initiative or it may be obtained by request of the player using either one or more of the plurality of player-activated buttons 18, the video display itself if video display 20 comprises a touch screen or similar technology, buttons mounted about video display 20 (not shown) which may permit selections such as those found on an ATM machine where legends on the screen are associated with respective selecting buttons, or through use of the keypad shown beneath video display 20.

In one exemplary embodiment, the gaming machine 10 includes two distinct primary games, referred to as a first primary game and a second primary game which are operable together with first primary game display 12 and second primary game display 22, respectively. The first primary game is a reel game including one or more indicia-bearing reels and the second primary game is a wheel game. A game selector is connected to the gaming circuitry and selects the game that will be played when a player initiates a game by making a wager and pressing the 'play' button (which may be one of the buttons 1 8 or may be some other player interface device such as an input device connected to video display 20) or pulls handle 19. In one embodiment, the games are randomly selected. Optionally, in another embodiment, a random number generator (RNG) may be used to select one of the multiple primary games offered on a gaming machine. The weighting of the RNG may be selected to statistically select the first primary game more often than the second primary game. By example, the RNG may be weighted to statistically select the second primary game, once in every thirty plays of the gaming machine 10. In one embodiment, the selection of primary games is independent of the play or gaming result of the other primary game and strictly driven by an RNG or some similar operation. In another embodiment, the selection of one of the primary games may be driven by an event on gaming machine 10, such as a win of an additional play of a selected game. Additionally, it may be appreciated by example that a counter may be used in place of an RNG to select the second primary game. For instance, when a game is played on the gaming machine 10, the first ten plays will be of the first primary game and the eleventh play will be of the second primary game. This sequence may run continuously independent of the player such that a gaming machine counter automatically triggers the selection of the game played. Alternatively, the gaming machine counter can reset to zero or one each time a new player begins play.

Referring back to FIG. 1, a reel game is presented on the first primary game display 12 and includes three mechanical spinning reels 45. In alternate embodiments, those skilled in the art will appreciate that any number of spinning reels may be used. The mechanical reel game presented in the first primary game display 12 is a game of chance wherein a player receives one or more outcomes from a set of potential outcomes indicated by award schedule 170. Each reel is designed to rotate and then stop in order to display at least one, and preferably, a number of indicia. If the combination of indicia displayed by the reels is one of the predetermined plurality of winning indicia sets, then the player is provided with a winning payout either through a coin dispenser or by increasing the player's credits in a credit window.

As shown in FIG. 1, the second primary game display 22 presents a wheel game comprising a wheel 23 and pointer 24. Wheel 23 is a fixed illustration of a wheel that includes payout indicators 26 on the face thereof. Various values are identified on the payout indictors, e.g., "1000", "250", "60", "125", etc. A pointer 24 is located in proximity to the wheel 23 so as to rotate about the illustration of the wheel 23. During play of the secondary game, the pointer 24 moves in a circular motion around the stationary wheel 23 and eventually comes to a stop in front of a payout indicator 26, thereby indicating a payout on the wheel 23 which the player has won. Alternatively, the pointer 24 is fixed and the wheel 23 spins. Optionally, in one embodiment, the wheel 23 is a remappable wheel as described above.

Conventionally, payout indicator 26 is identified by gaming software operating on or in conjunction with gaming machine 10 through a random generator, such as a random number generator. The random generator assists in avoiding potential defective mechanical components that may drive an unlikely number of wins or losses. Prior to identifying payout indicator 26, the rate of speed of the spinning portion is adjusted to slow down to give an illusion of a free spinning device in order to build excitement and enjoyment of the player as the moment of selection builds.

In another embodiment, a second primary game display 22 comprises a wheel game having an illuminated physical pointer 24. Additionally, lights are placed about the axis of the wheel 23 (not shown). In this and other similar embodiments, the lights are selectively turned on and off until a selected payout indicator 26 is illuminated to identify the winning selection. The lights may be conventionally controlled by circuitry tied to the gaming machine processor and software. The lights may sequentially turn on and off to give the illusion of spinning or may randomly turn on and off until the selection is made in accordance with a conventional random number generator (not shown). Additionally, the lights may include a pointer light that is a different color from the other lights. By example, the lights may be blue and the pointer light may be red. The blue lights may remain on while the red light (which may be comprised of several consecutive lights) may be sequentially turned on and off to give the illusion of a spinning red light which ultimately will stop adjacent to the selected payout indicator 26. It may further be appreciated that the lights may comprise light emitting diodes (LEDs) with red-green-blue or similar coloring which came be activated according to an algorithm or pattern to cause particular visual affects that generate excitement or entertainment to a player. Optionally, in one embodiment, the above described wheel game includes a remappable wheel.

Depending upon the occurrence of a winning outcome, the lights on the gaming machine 10 may begin flashing dramatically, a horn or other sounds may be emitted through the speakers 21, and a light 28 may be flashed in order to develop a sense of fanfare around a winning player and to alert casino floor personnel that a large win has occurred so that they may congratulate the winner, notify the winner of the payout, pay the winner, and/or reset gaming machine 10. Also, gaming machine 10 may be conventionally linked through a network to a host computer to provide notification to the casino of the win. Depending upon the casino management system, payouts on large wins at gaming machine 10 may be made directly to a player account managed by the host computer; in which case, the player is notified at gaming machine 10 that the player's account has been credited.

Optionally, in an alternate embodiment, the wheel game in the second primary game display 22 is a stationary wheel face 22 having multiple wheel segments 26 wherein separate prize amounts are indicated on each wheel segment 26. The pointer 24 rotates or moves in a circular motion around the stationary wheel face 22 and stops on a wheel segment 26 to indicate the winning outcome. Additionally, in an optional embodiment, the wheel game in the second primary game display includes a remappable wheel.

Additionally, in an optional embodiment, the gaming machine 10 includes a main controller (not shown) that drives any moveable portion of the wheel game (e.g. wheel 23, pointer 24), the reels 45 and other peripherals such as the video display 20. In an additional embodiment, the main controller supervises the download of video content.

Figure 2:
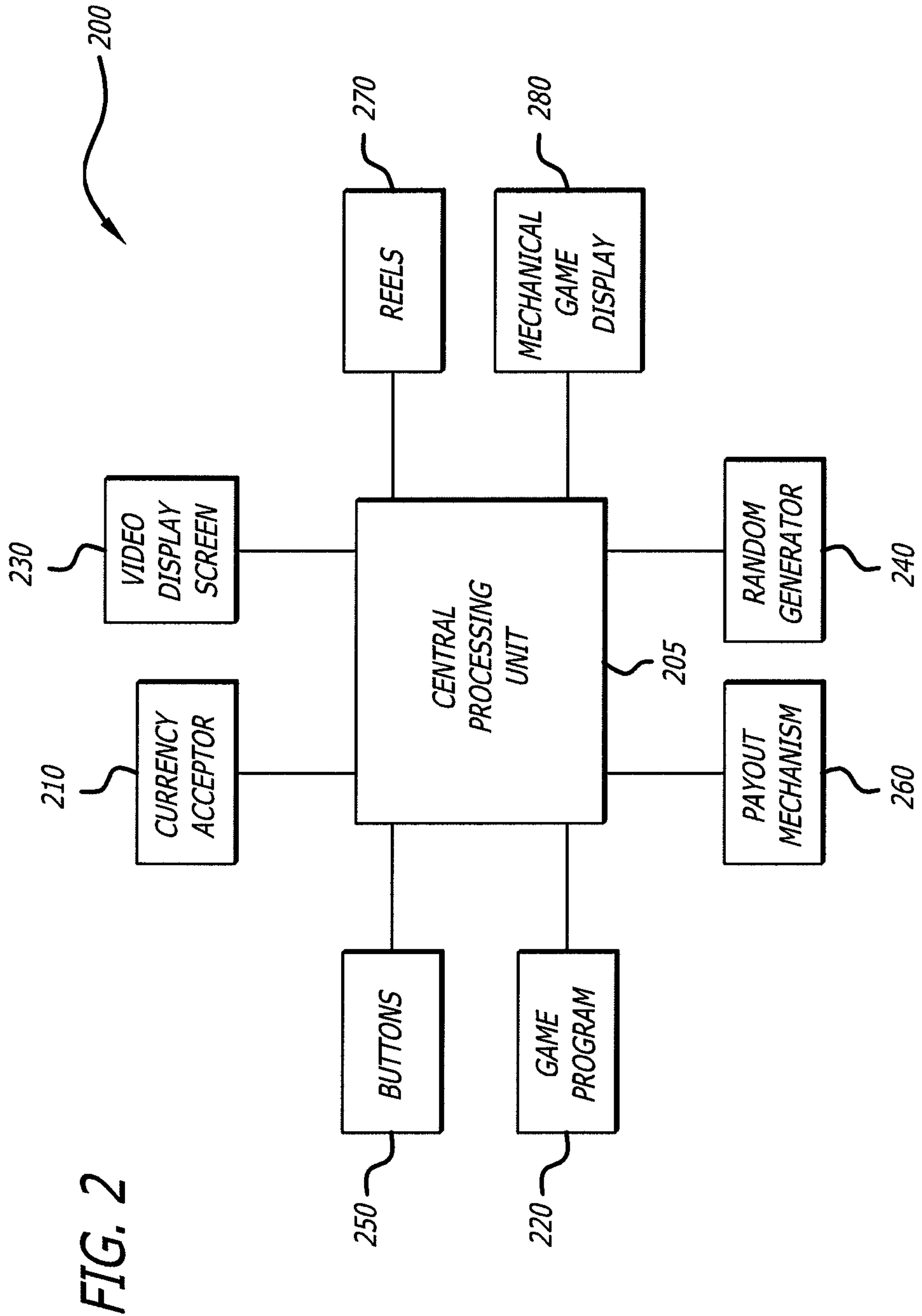
FIG. 2 is a block diagram of system components for operating an embodiment of a gaming machine comprising multiple primary games.

Referring now to FIG. 2, the block diagram 200 illustrates example system components for operating an embodiment of a gaming machine 10 comprising multiple primary games. Typically, game play is activated upon the receipt of a player wager or bet. A player may place a wager by inserting or entering a form of currency such as, but not limited to, paper currency, coins or tokens, cashless tickets or vouchers, electronic funds transfers, credits or the like into the game machine. The player then enters his wager amount. Upon receiving the player's wager, the game currency acceptor 210 signals the central processing unit ("CPU") 205.

The CPU 205 then instructs a random generator 240 to randomly select a primary game to be played. Generally, the gaming machine 10 offers at least two distinct primary games for play. In one embodiment, the random generator 240 is a random number generator. In one embodiment, the random selection of the primary game is evenly weighted. For example, in a gaming device offering two distinct primary games, both games may be played, 10 times out of 20, on average. Optionally, the random selection may not be evenly weighted. For example, one primary game may be played 17 times out of 20, and the other game 3 out of 20, on average.

Referring back to FIG. 2, once the random generator 240 selects a primary game, the CPU 205 executes a game program 220 that activates the play of a game in either the first primary game display 12 or in the second primary game display 22. The random generator 240 responds to instructions from the CPU 205 to provide a randomly selected outcome for each game. The CPU 205 then stops the selected game according to the outcome and a payout is awarded to the player as appropriate. In an optional embodiment, the outcome is evaluated, and then a payout is awarded as appropriate. In some embodiments, predetermined payout amounts for certain game outcomes are stored as part of game program 220. Such payout amounts are, in response to instructions from the CPU 205, provided to the player in the form of coins or credits by the payout mechanism 260.

In various embodiments of the gaming machine 10, the game program 220 is stored in a memory device (not shown). By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the gaming machine 10 are stored in a memory device (not shown).

Referring back to FIG. 1, the first primary game is implemented on gaming machine 10 using three mechanical spinning reels 45. A pay line (not shown) passes through one indicium on each of the reels 45. The player selects the number of credits or coins wagered on the pay line using buttons 18. It will be apparent that any number of pay line patterns may be made available for play. The player may also collect the balance of his credits by pressing a CASH OUT button (not shown).

A credit meter (not shown) displays the player's current credit balance, while other meters may display the total bet size and the last amount paid by the payout mechanism. The player initiates game play by depressing a SPIN button 30 or by operating (e.g., pulling) the handle 35. Alternately, the player may simultaneously select the maximum number of coins or credits allowed and initiate the game by pressing a MAX BET button 38.

If the random generator 240 selects the first primary game, mechanical reels 45 are made to spin and subsequently stop in their predetermined stop positions (note: the stop positions were randomly predetermined before the start of the game), and a determination is then made whether the stop positions of the reels results in a winning game outcome. Winning outcomes are indicated on a pay table 70. In alternate embodiments, the pay table may be presented on a video display. On a video machine, the pay table representation of a win event is often placed on a second display or on a multi-page help screen accessible through a HELP or PAY TABLE button (not shown).

A winning combination, for example, could be three or more "BAR" symbols adjacent to one another on the pay line. For each winning combination, the player may typically receive the award identified in the pay table 170. The award, however, may be adjusted as necessary based on the number of credits wagered on the pay line or on the game. In other words, the amount of the prize awarded may be based on the amount wagered. Optionally, in alternate embodiments, the number of coins in determines what prize a player is eligible to win. In other embodiments, video representations of pay tables factor in the amount of the player's wager and no additional award adjustment is required.

In one embodiment, the funding of each of the primary games is based on the wagers placed for each primary game. Optionally, in another embodiment, the prize may be funded based on "coin-out", as disclosed in U.S. application Ser. No. 11/212,533, entitled "COIN-OUT GAMING REWARD SYSTEM," filed on Aug. 25, 2005, which is hereby incorporated by reference. Alternatively, the primary games may be funded based on non-gaming revenues (e.g., promotional dollars).

In various embodiments, winning combinations may be evaluated across adjacent reels from left-to-right, from rightto-left or both. Additional winning combinations may be awarded when certain indicia do not necessarily accumulate adjacently on the pay line, but rather, appear anywhere on the reels (i.e., "scatter pays"). In addition, "wild" symbols may contribute to winning combinations.

If the random generator 240 selects the second primary game, reels 45 do not spin. Instead, the pointer 24 on the second primary game display 22 begins to rotate. The pointer 24 may be configured to rotate in a clockwise, counter-clockwise or random fashion before being brought to a stop adjacent to a win amount. For example, referring to FIG. 1, the pointer 24 is stopped at 150 credits. Additionally, the pointer 24 may be brought to an abrupt stop or may gradually slow down before stopping in order to create a sense of anticipation for the player.

Optionally, in an alternate embodiment, the second primary game includes a remappable wheel. Prior to the pointer 24 stopping adjacent to a win amount, the wheel segments displaying the win amounts are remapped.

Optionally, in another embodiment, lighting effects are utilized to focus the player's attention. More particularly, backlighting in combination with sound effects direct the player's focus to the selected game on the machine. For example, in one embodiment a gaming machine 10 includes lighting in and around one or more of the primary games. Additionally, lighting and/or sound may also be utilized in the video display 20. More particularly, after a player enters his wager amount, the process for selecting a primary game is triggered. If the reel game is selected, lighting in the second primary game display 22 is turned off or significantly decreased. Additionally, lighting and video effects can be utilized in the video display 20 to draw the player's attention downward towards the reel game in the first primary game display 12. Additionally, sound effects can be added to enhance the effect and increase excitement. Optionally, if the wheel game is instead selected, the lighting in the first primary game display 12 is turned off or significantly decreased. Pulsating lights can be utilized to direct the player's attention in an upward direction toward the wheel game presented in the second primary game display 22. Additionally, the video display 20 may be utilized to direct the player's attention upward toward the wheel game. Sound effects, such as a pulsating beat or other sounds can be used to focus the player's attention upward and increase the excitement of the game.

Figure 3:
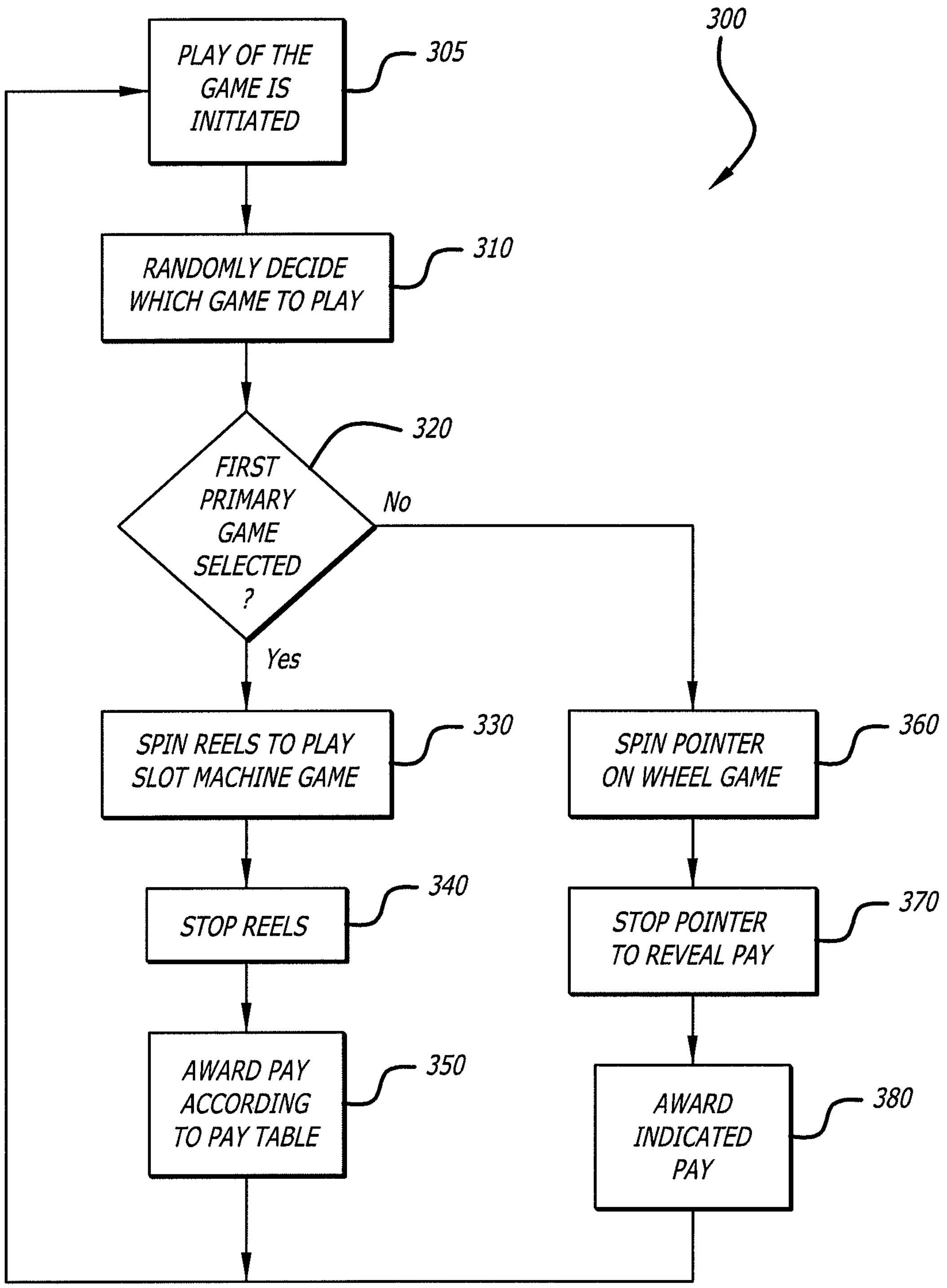
FIG. 3 is a functional block diagram illustrating a method for providing multiple randomly selectable primary games in a gaming device.

FIG. 3 is a functional block diagram 300 illustrating a method for dynamically determining a mechanical primary game display presentation. The order of actions as shown in FIG. 3 and described below is only illustrative, and should not be considered limiting. First, at step 305, the game is initiated on the gaming machine 10 of FIG. 1. For example, a player initiates game play by inserting currency of some form, selecting the denomination and quantity of a wager (which may include selecting a number of lines to play and selecting a number of credits to bet per line), and activating a start button or mechanism. Once game play is activated, a primary game is then randomly selected in step 310 to be presented to the player. In one embodiment, a random generator is used to make the random selection. Optionally, other mechanisms may be used to carry out the random selection process.

In one example embodiment, the gaming device includes two primary games. However, the gaming device may include any number of primary games and is not limited to two games. In this example, the first primary game is a slot machine game and the second primary game is a wheel game. Referring back to FIG. 3, if at step 320, the first primary game is NOT selected, the second primary game (e.g. the wheel game) is activated in step 360 and the pointer 24 rotates or moves in a circular motion around the wheel 23. In step 370, the pointer 24 stops to reveal a payout and, in step 380, an award is indicated, and thereafter paid out as appropriate.

Referring back to step 320, if the first primary game IS selected, then the process proceeds to step 330 and the reels 45 on the slot machine primary game spin. Next, in step 340, the reels 45 stop and in step 350 a payout is awarded according to the pay table.

Figure 4:
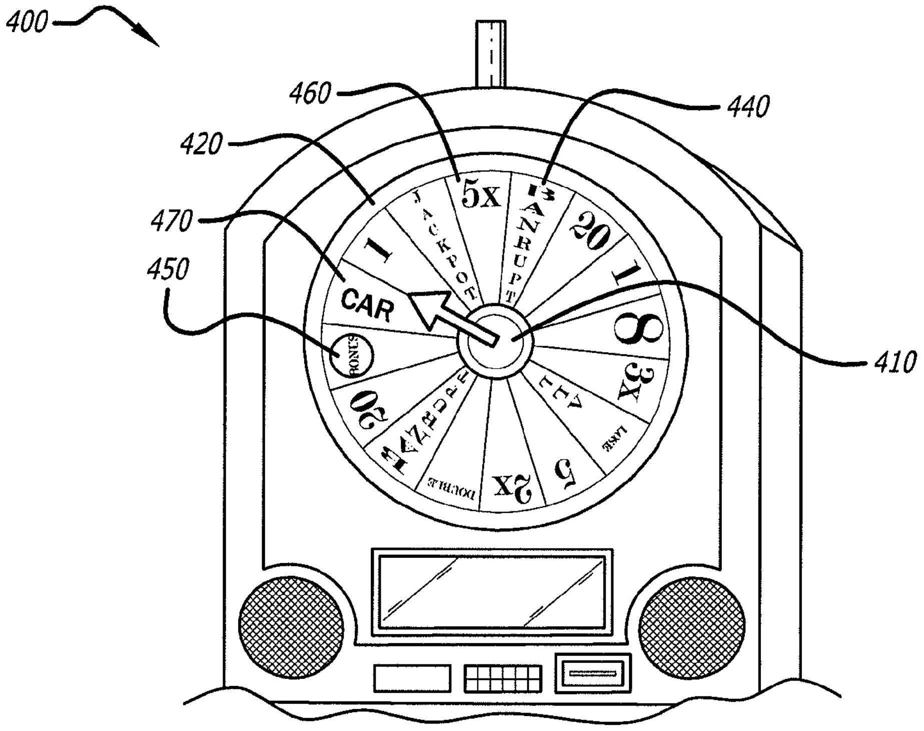
FIG. 4 illustrates an embodiment of a mechanical wheel primary game display having various types of indicia.

In one embodiment, the second primary game is a wheel game and the indicia displayed on the wheel are numerals representing amounts in credits, coins or some other representation of value. However, other kinds of indicia may also be displayed on the wheel. Referring now to FIG. 4, an alternative wheel 400 is illustrated. The indicia on the wheel face 420 of primary game display 400 may include any type or combination of indicia such as multipliers 460 (e.g., 2×, 5×, 10×), symbols 450 (slot machine indicia such as fruit, card faces or the like) or words 440 (JACKPOT, DOUBLE, RESPIN) or representations of non-monetary prizes (CAR, BOAT, FOOD). The indicia may be used individually or in combination to convey game results to the player. For example, in one embodiment, rotating pointer 410 spins two times, indicating first a "20", then a "RESPIN." The display of a RESPIN result causes rotating pointer 410 to move a third time, for example, to a "10×" indication. The entire sequence, therefore, would indicate a game outcome of 200 (20 times 10), coins or credits. In some embodiments, the award indicated by the primary game display may be adjusted as necessary based on the number of credits wagered on the game. It should be appreciated that the above examples of mapping a possible game outcome to a display presentation are intended to be illustrative and should not be construed as limiting in any way.

Other methods may be used to provide an entertaining presentation of a numeric win amount. For example, one entertaining presentation mechanism is disclosed in U.S. provisional Application Ser. No. 60/727,400 entitled "EXPANDED PRIMARY PAYOUT INDICATOR FOR A GAMING DEVICE," filed on Oct. 17, 2005, which is hereby incorporated by reference. In one embodiment, once the game results have been evaluated and a total win amount is known, the gaming machine may employ an algorithm that dynamically calculates one or more display pointer presentations that will, when presented, accumulate a total equal to the win amount. For example, if a primary game display has potential pay values of 1, 2, 4, 8, 10, 20, 100 and 2×, it would be possible for such an algorithm to show a pay of 100 using a single 100 presentation, a sequence of 20-8-2-10-2×-20, or any other combination totaling 100.

Figure 5:
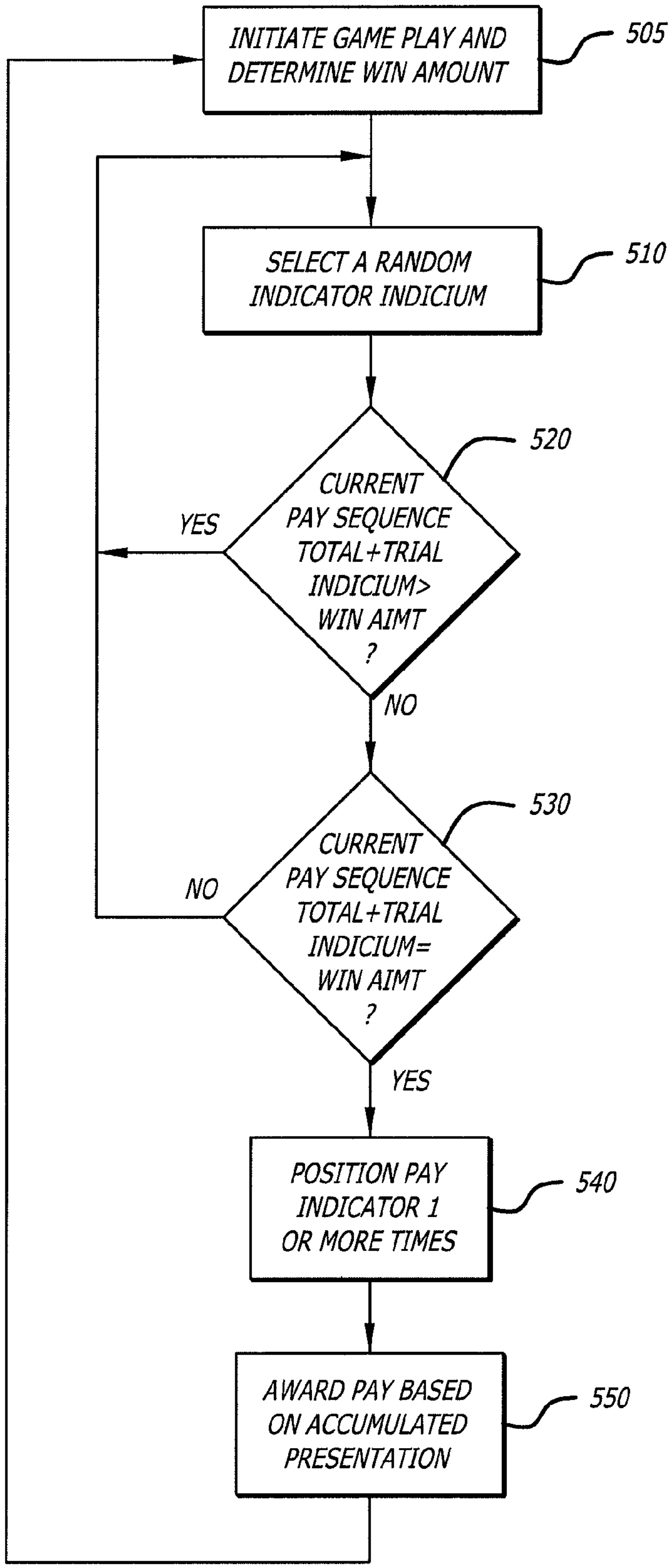
FIG. 5 is a functional block diagram illustrating a method for dynamically determining a mechanical primary game display presentation.

FIG. 5 is a flow diagram generally depicting the acts associated with carrying out an example of a mechanical primary game display (such as a pointer) sequence. The order of actions as shown in FIG. 5 and described below is merely provided for illustrative purposes, and is not intended to be limiting. The example algorithm uses a random trial-and-error to produce a valid presentation sequence by repeatedly selecting a presentation value, seeing if applying this value to the current presented total would exceed the actual win amount and, if not, including this presentation value in the display sequence until the actual win amount has been exactly reached.

First at block 505, the actual win amount is determined. For example, the player initiates play of the game by inserting currency of some form, selecting the quantity of a wager and presses a start a button or switch. The game may also be randomly selected for play as described above.

Next, at block 510, a random pay amount for the game outcome is selected using a random generator. Using the pay determined in block 510 as a target, the random generator is further used to select one of the available pay indicia on the primary game display indicator at block 520. If a relatively short display sequence is desired, a weighted table may be used to favor certain higher amounts, 100, for example, on the display.

A trial addition of the currently selected pay indicium is applied to the current presentation sequence total, i.e., the amount the current presentation sequence would display if presented immediately, at decision block 520 to see if the resulting new amount would exceed the actual win amount. For example, if a total pay presentation of 100 is required, the current presentation sequence total is 80 and the currently selected indicium is 200, the currently selected indicium would not be added to the display presentation sequence and processing would return to block 510 for selection of a new trial indicium. It should be noted that, as long as there is at least one indicium on the display face, a valid sequence will eventually be selected.

If the trial application of the selected pay indicium does not exceed the actual win amount, the indicium is added to the display sequence and processing continues to block 530, where it is determined whether the current sequence will display the actual win amount exactly. If so, the sequence is fully constructed and processing proceeds to block 540 otherwise, processing returns to block 510 for selection of another indicium.

At block 540, the display pointer is sequenced through one or more positions that progressively reveal the win amount to the player. Processing continues at block 550 where the accumulated pay amount that has been shown by the display is awarded to the player. Normal play resumes at block 505.

Figure 7:
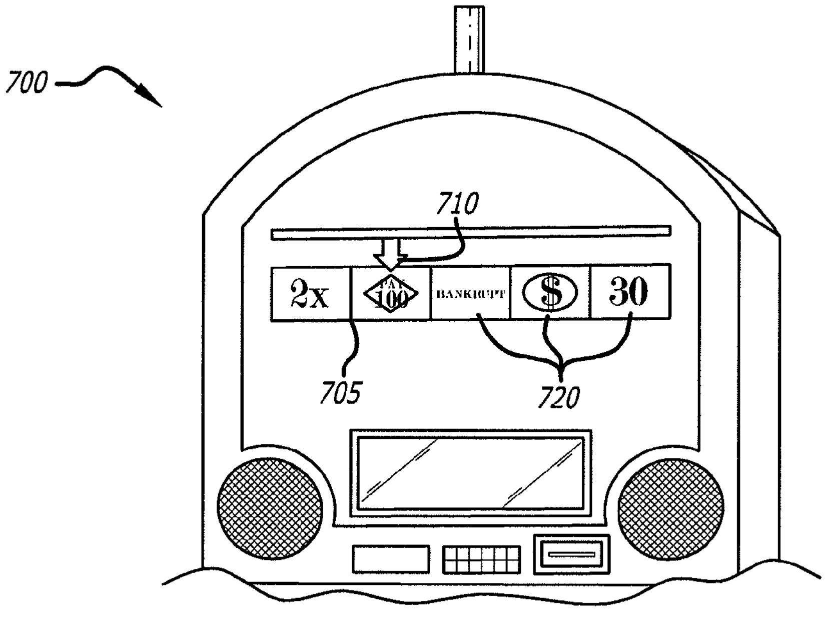
FIG. 7 illustrates an embodiment of a gaming machine having a primary game display using a linear moving pointer.
Figure 6:
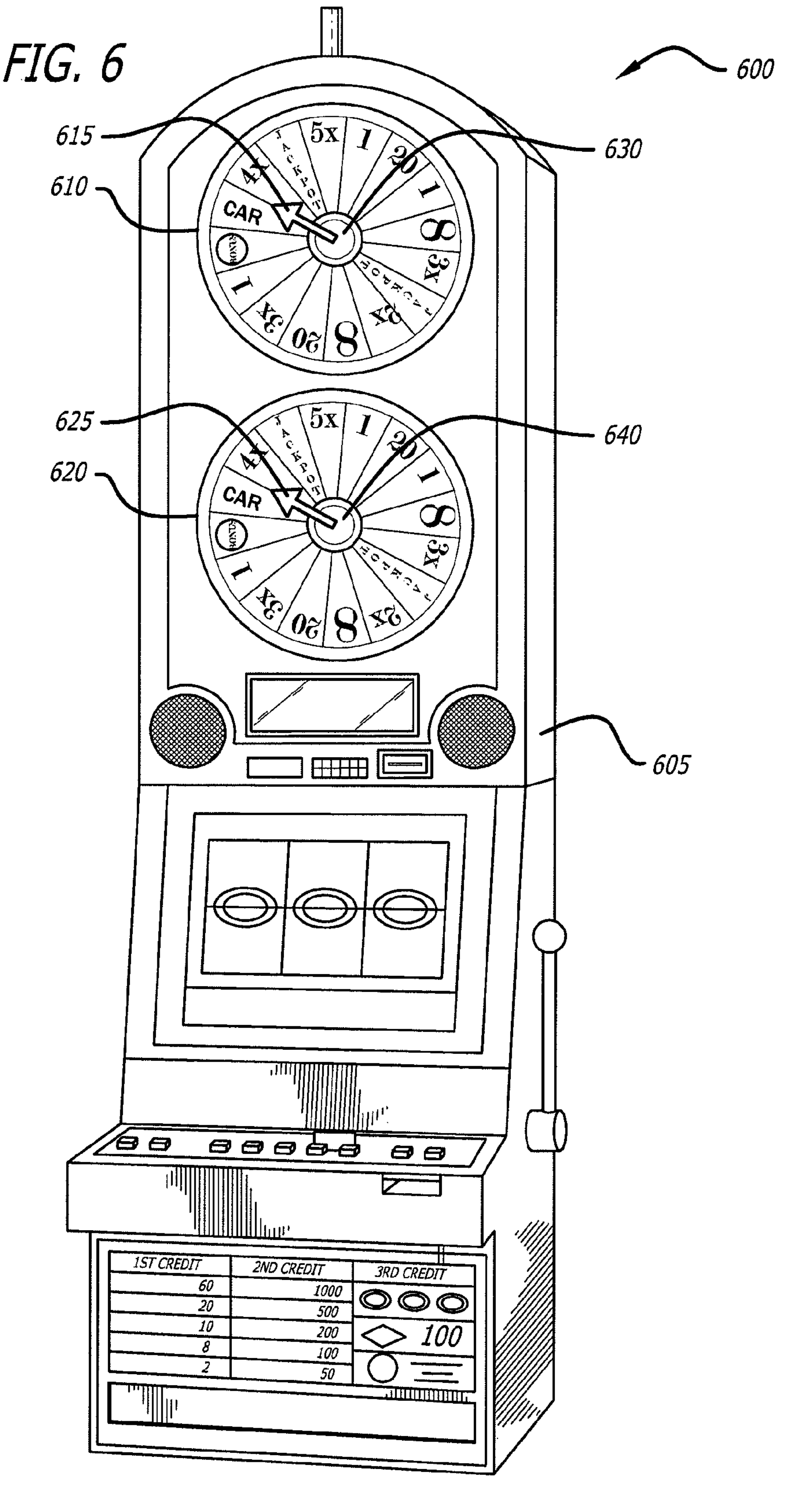
FIG. 6 illustrates an embodiment of a gaming machine having a mechanical primary game display with two game wheels.

In an optional embodiment, the gaming machine 10 offers at least three distinct primary games for play. Referring to FIG. 6, gaming machine 600 has two mechanical display indicators 610 and 620, which may be used in combination to represent a win value for a single primary game. For example, two pointers 615 and 625 on wheel faces 630 and 640 both indicate pays of 150 for a total pay of 300. A single one of these devices could be used to indicate multiple values sequentially (multiple spins) or simultaneously (using multiple pointers on one or more wheel faces). Displays could be viewed through multiple windows in front of one or more disks or the entire disk(s) may be visible. In other embodiments, the primary game display may take any shape or form such as, by way of example and without limitation, additional reels, a rotating wheel or disk, or a clock-like face. The wheel may take the form of a "light wheel" or "light bar" on which one or more illuminated lights indicate the position of a plurality of simulated pointers. In still further embodiments, the mechanical primary display may comprise a linear representation of a stationary pointer beside or beneath which pay indicia move or, as illustrated in FIG. 7, primary display indicator 700 may comprise a plurality of indicia 720 and one or more movable pointers 710 arranged to stop adjacent to and indicate any of the indicia. Alternately, video representations of these or similar primary game displays may be used.

Referring back to FIG. 6, in one embodiment either or both of the wheels shown on gaming machine 600 may be a remappable wheel.

Figure 8:
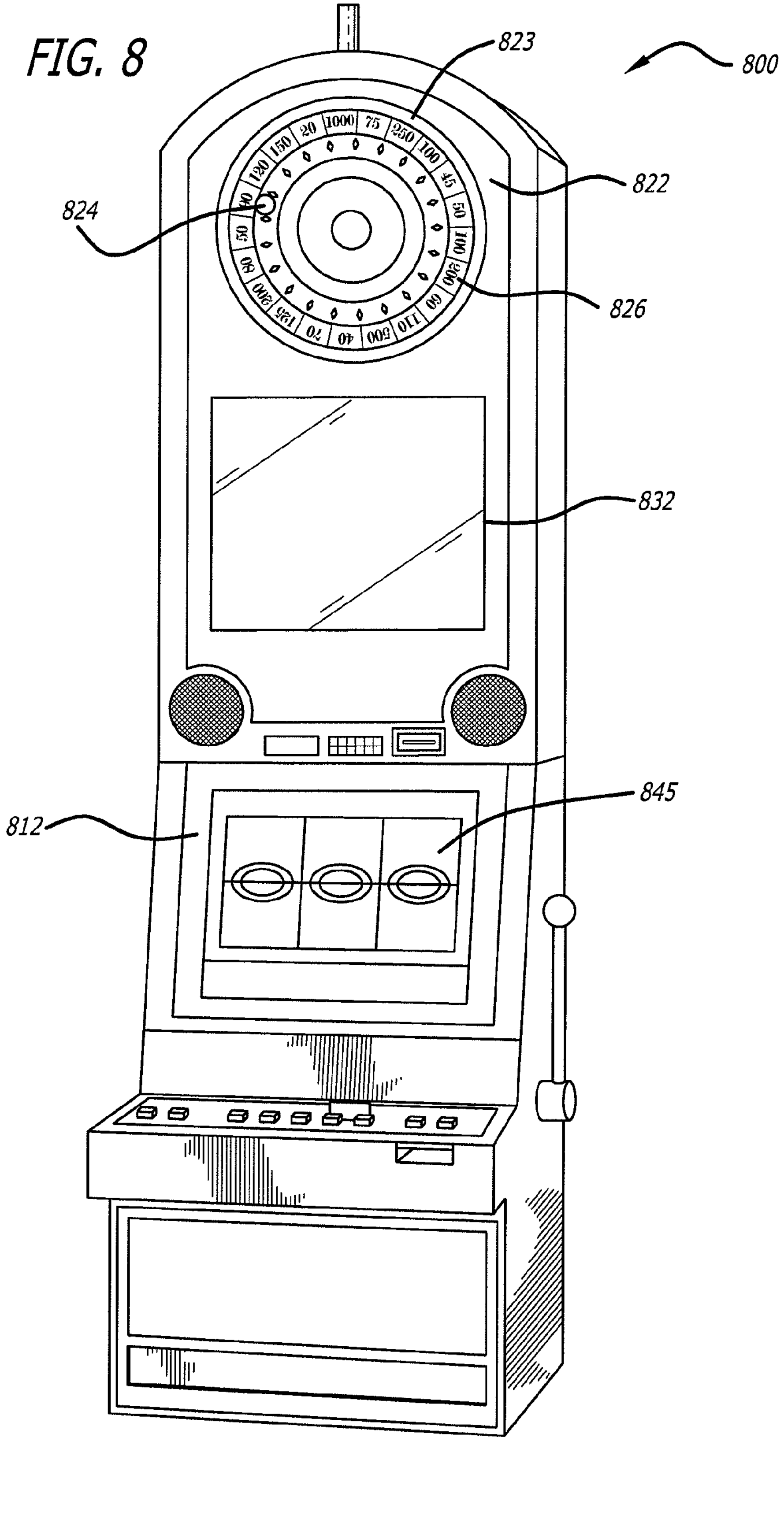
FIG. 8 illustrates an embodiment of a gaming machine comprising two or more primary games.

In an alternate embodiment, a gaming machine may be configured to offer at least three different types of primary games for play. Referring to FIG. 8, a gaming machine 800 offers a reel game, a wheel game and a video game. A reel game is presented in a first primary game display 812 and a roulette-style wheel game is presented in a second primary game display 822. Optionally, in one embodiment, the wheel game may include a remappable wheel. Additionally, a video-type game of chance is presented in a third primary game display 832. The video game may include one or more games of chance such as, but not limited to, video slots, video poker, video blackjack, video keno, video representation of a wheel game or any other video representation of a game of chance. In alternate embodiments, the third primary game display 832 may present games of skill or game of chance involving some player skill.

Those skilled in the art will readily recognize that while two primary games have been illustrated that are randomly or systematically activated on gaming machine 10, gaming machine 10 may have three or more primary games that may be implemented to play selectively as discussed above through a random or systematic selection. Additionally, it may further be appreciated that each of the games could be operated on a remote host computer, such that gaming machine 10 operates the respective gaming and video displays in conjunction with the host computer game play; and, a player initiates play through the player interface with the host computer over a network. It may further be appreciated that while a wheel game has been illustrated and described, wheel 23 could be replaced by a square, circle, polygon, or other area representation in which the various payout indicators 26 of different shapes and sizes may be situated and identified or selected with a pointer or a light, that is randomly determined according to the software and/or hardware of gaming machine 10. As an example, a square game may include a large square surrounding a set of squares with payout values and a pointer light that sequentially or randomly lights each of the squares until a payout square is selected. Additionally, it may further be appreciated that the pointer 24 may be represented in a variety of shapes, such as but not limited to a circle, square, triangle, arrow, ball or any type of symbol. Optionally, in an alternate embodiment, a wheel game may include multiple pointers, for example in the shape of balls, or any other shape.

In another embodiment, a player can place bets in anticipation of the type of primary game that will be selected. For example, in a gaming machine offering two distinct primary games, the player may place two distinct wagers. More particular, the player may wager 3 credits for a first primary game and may wager 2 credits for the second primary game. Play of the game is activated by pressing start (or via some other activation means). Once the gaming machine receives the multiple wagers, the gaming machine then randomly selects a game to present to the player. If the gaming machine presents the first primary game, then the player's 3-credit wager is applied. Similarly, if the second primary game is instead presented to the player, then the player's 2-credit wager is applied. As those skilled in the art will appreciate, any combination of wagers may be placed in this type of game scenario. Optionally, in an alternate embodiment, the game sacrifices one of the multiple wagers placed. For example, a player makes a 3-credit bet on the first primary game and a 2-credit bet on the second primary game. After the player presses start, the first primary game is randomly selected and is displayed on the first primary game display. The player's 3-credit bet is applied to the first primary game and the player's 2-credit bet (placed on the un-played second primary game) is sacrificed.

Optionally, in one embodiment, in a gaming machine 10 having at least two primary games, each game has its own math model. For example, in one embodiment a gaming machine has a first primary game and a separate, second primary game. More particularly, the first primary game has a math model separate from the second primary game. As a result, the player's entire wager is devoted to the primary game being played. Alternatively, in an optionally embodiment, only a portion of the player's wager is devoted to the primary game being played. In an optional embodiment, the wager received is applied towards all primary games. For example, if the gaming machine offers two primary games, then under this exemplary scenario a received wager is applied to both primary games.

In another embodiment, the gaming machine requires a minimum wager to trigger game play. For example, in one embodiment a minimum wager of thirty credits is required. Those skilled in the art will appreciate that any minimum wager value may be implemented to trigger game play. Referring back to the thirty-credit minimum wager example, in one embodiment, the funds are applied to a general pool. If the gaming machine offers a first primary game and a second primary game, the minimum required credits for play may qualify the player for either game. If the first primary game is a reel game and the second primary game is a wheel game, then on a thirty-credit wager, if the reel game is selected, the player is allowed twenty lines of play in the reel game and ten credits are applied to the wheel game. Those skilled in the art will appreciate that the gaming machine may include any number of additional primary games.

Alternatively, in an optional embodiment, a minimum wager amount is required for each primary game. The required minimum wager may be the same for each primary game. Optionally, in other embodiments, the required minimum wager may vary for different games. For example, in one embodiment the gaming machine provides two different primary games: a wheel based primary game and a reel based primary game. In one embodiment, a minimum bet of 10 credits is required to play the reel game and a minimum bet of 30 credits is required to be eligible for the wheel game. Those skilled in the art will appreciate that the required minimum bet may be any value. In another example, a minimum bet of 25 credits is required to play the reel game and minimum bet of 35 credits is required to be eligible to play the wheel game. Under this scenario, if the player places a bet of 30 credits , he would only be eligible to play the reel game.

Additionally, in another embodiment, any game may be selected regardless of the amount the player wagered. However, the prize amount will change based on the player's wagered amount. In an optional embodiment, multiple spins are provided and occur based on the player's wager.

Optionally, in an alternate embodiment, the gaming machine limits the player's betting options. More particularly, in an optional embodiment, instead of specifying the number of lines and the number of coins per line, the player is only allowed to enter a total wager amount, which is then distributed on his behalf by the game logic. This provides a simpler interface for the player and controls the play experience.

In another embodiment, wherein one of the primary games is a wheel game, segments of the wheel will only pay if purchased. In other words, the machine may "land" on a winning outcome, but if the outcome was not purchased by the player, no payout is awarded. For example, in one embodiment, the wheel is divided into red, white and blue segments (not shown). A low bet range would purchase the red segments. If the game stops on a white or blue segment, the player does not receive a payout award. Rather, the player only receives a payout if the game stops on a red segment. A medium-sized bet might buy both the red and the white segments. Larger bets to the max bet would buy the red, white and blue segments. In one embodiment, the lower, more frequent pays would occur with the red segments. Optionally, one "higher paying award" may be contained on a red segment. However, the higher pays would generally be contained in the white and blue segments. In another embodiment, after the player places his wager, the eligible segments are indicated by the use of lights. More particularly, if a player places a lower bet on the red segments, then the eligible red segments would "light-up" and the non-eligible white and blue segments would be darkened, or alternatively, not as brightly lit.

In an alternate embodiment, a wheel-based primary game remaps the wheel based on the size of the placed bet. More particularly, each wheel segment displays a prize amount. A particular weight, or probability of selection, is associated with each wheel segment. The probabilities associated with the wheel segments are dependent on the bet, or wager, placed by the player. For example, in one embodiment, the wheel will generally have heavier weights on lower-paying segments than on higher-paying segments. This increases the probability of a lower paying segment being selected for the game outcome. The weights on the higher-paying segments will generally increase as the amount of the bet increases.

In one embodiment, particular weights are associated with each bet size. Optionally, the segment weights do not change for each wager amount, but are broken into sets divided by breakpoints. For example, one set of weights may be assigned for a wager of one to ten betting units, a second set of weights may be assigned for a wager of eleven to twenty units, and so on. The particular breakpoints and associated weights may be pre-configured by the game manufacturer, or may be configurable options of the game set by the game operator. Those skilled in the art will appreciate that any number of breakpoints and ranges may be used to define the various wheel segment weights.

Additionally, in an optional embodiment, a gaming machine 10 may be used in a casino gaming system. In one embodiment, the gaming machine is operatively connected to a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on a gaming machine 10. The input components receive information from a player identification device. For example, these input components may include, but are not limited to, a slot for receiving a player tracking card, a keypad or equivalent, an electronic button receptor, a touch screen, or the like. Additionally, the player identification device may utilize RFID, wherein player information is transmitted to an input device configured to receiving the transmitted signal. The player tracking system may also include a database of all qualified players (i.e., those players who have enrolled in a player rating or point accruing program).

Generally, the database for the player tracking system is separate from the gaming machine 10. In one embodiment, the insertion of a player tracking card, triggers the random selection process of one of the multiple primary games offered on the gaming machine 10. Optionally, in another embodiment, information received from a player identification device may trigger the play of a wagering game having a remappable wheel.

Referring back to FIG. 1, in one embodiment, once information is received from a player identification device, player specific information may be presented to the player in the video display 20. Optionally additionally information such as, but not limited to, game related information, advertisements and casino promotions, graphic displays, news and sports updates, and another game, may be presented to the player in video display 20. This information may be generated through a host computer networked with the gaming machine 10 on its own initiative or it may be obtained by request of the player using either one or more of the plurality of player-activated buttons 18, the video display itself if video display 20 comprises a touch screen or similar technology, buttons mounted about video display 20 (not shown) which may permit selections such as those found on an ATM machine where legends on the screen are associated with respective selecting buttons, or through use of the keypad shown beneath video display 20. Alternately, in an optional embodiment, a game having a remappable wheel may be presented to a player in the video display 20. Information received from player identification device may trigger the display of the game to a player.

Generally, player tracking systems have long been limited to small displays and fairly generic sound capabilities. However, it is desirable to incorporate a wide variety of output (and potentially input) devices into a player tracking system. Additionally, promotional system-based games are relatively new, and have thus far been limited to video presentations on fairly small screens. It would be advantageous to produce a device and/or system that would enable a player tracking system and/or a promotional system game to utilize larger gaming presentations or other peripheral devices.

In one embodiment, the gaming machine 10 includes a universal game monitoring unit (not shown), as disclosed in U.S. application Ser. No. 11/456,541 filed Jul. 10, 2006, entitled UNIVERSAL GAME MONITORING UNIT AND SYSTEM, which is hereby incorporated by reference. The universal game monitoring unit (UGMU) employs programming and an operating system that enables the UGMU to expand beyond the function of a traditional game monitoring unit to include system-game features, including by way of example only, and not by way of limitation: (1) driving a graphic display (e.g., a video screen) for presentation of a game to casino patrons; (2) driving mechanical reels (or other mechanical game presentation components) over an interface, such a USB; or (3) driving other gaming peripheral devices 440 (e.g., coin acceptor, bill acceptor, hopper, printer and the like).

Additionally, in one embodiment, the universal game monitoring unit includes a player tracking system and interesting indicators that are provided on a traditional small graphics display screen. In addition to creating a more compelling presentation, the universal game monitoring unit has the potential sales advantage of necessitating additional hardware to support the deployment of these premium player-tracking systems. Furthermore, many payout indicators and peripheral devices, such as, but not limited to wheels, reels, lights, and the like, can be connected to an expanded display device controller of the universal game monitoring unit at the gaming machine 10 for presentation by the player tracking system of the universal game monitoring unit.

One peripheral device that is controllable by the universal game monitoring unit (UGMU) controller of the universal game monitoring unit is a Monte Carlo-style wheel (or other similar wheel display). In this specific, non-limiting example, a Monte Carlo-style wheel controller is attached to the UGMU controller of the universal game monitoring unit using a USB, serial port, or other appropriate interface. Using this configuration, a system-based Monte Carlo reel spinning game can be played on a UGMU display screen, thereby enabling the wheel device to be spun, as needed, to enhance player appeal. By utilizing the universal game monitoring unit in this manner, any popular game (e.g., the Bally Monte Carlo game) can now be made available on any gaming machine 10 in a casino, regardless of the base game and the manufacturer of the base game. This dramatically increases the variety and proliferation of game themes available across a casino floor, as well as breaking down barriers created by competing game manufacturers.

As described above, a peripheral device such as a Monte Carlo-style wheel (or other similar wheel display) can be used (1) as the sole presentation for system-based game outcomes, (2) as a traditional "bonus" device (e.g. Monte Carlo) or (3) as an expanded primary pay indicator for a system-based game. Additionally, the Monte Carlo-style wheel may be a remappable wheel as previously described herein. Optionally, the map selected for defining the wheel segments may be determined by information received from a player identification device, include a player tracking card.

In an optional embodiment, the gaming machine comprises multiple primary games and a single game display. In FIG. 9, the gaming machine 910 includes two or more distinct primary games, either of which may be presented on the game display 912. In one embodiment, the game display 912 is a video display such as, but not limited to CRTs (cathode ray tubes), or thin-panel displays. Examples of thin-panel displays include plasma, LCD (liquid crystal display), electroluminescent (EL), vacuum florescent, filled emission, or any other types of thin panel displays known or developed in the art. Additionally, the video picture may be presented in either a portrait or landscape orientation and utilize standard or widescreen dimensions.

Additionally, more than one game may be shown or played simultaneously, substantially simultaneously or sequentially, in the game display 912. Optionally, the gaming machine includes two or more distinct primary games, and any of the games may be presented on the single game display 912. In an alternate embodiment, the gaming machine (not shown) comprises multiple displays and multiple primary games.

In one exemplary embodiment, the game display 912 presents one game at a time. In this example, the gaming machine 910 includes at least a first primary game and a second primary game. Those skilled in the art will appreciate that the gaming machine may include any number of additional primary games. Once game play is activated on the gaming machine 910, a primary game is selected for presentation to the player on the game display 912. In one embodiment, a selection means randomly selects the primary game. Alternatively, in another embodiment, a random number generator selects the primary game. Once the primary game is selected, the game is displayed on the game display 912. For example, if a reel game is the selected primary game, then spinning reels are presented on the game display 912. Alternatively, if a wheel game is selected, a wheel is instead presented on the display 912. Optionally, other types of games such as, but not limited to video poker, video blackjack, video keno, roulette, Class II bingo, and craps may also be shown on the display 912.

In an alternative embodiment, the game display 912 presents two or more games simultaneously. For example, once the game machine 910 is activated, a wheel game and a reel game are both simultaneously presented in different portions of the game display 912.

In another embodiment, the primary game state may be saved. In one example, the gaming machine 10 is operatively connected to a back end server via a network connection (not shown), and the game state information may be saved on the back end server. Alternatively, the game state information may be saved on a player identification card or an alternative memory means connected to the gaming machine 10. In another system-based embodiment, the accumulated symbols or units earned by a player during a playing session may be preserved at the termination of play such that the "game state" of the player is maintained from one playing session to another. By way of example and not of limitation, the player may later resume play of gaming machine 10 at the preserved game state by inserting an identifying player card, entering an identification sequence on the player interface, or inserting a voucher or other medium that identifies the particular saved game state. One such means is disclosed in U.S. Pat. No. 6,923,721, entitled "Apparatus and Method for Maintaining Game State," which is hereby incorporated by reference, but any means may be used provided the player is able to resume play without loss of accumulated units from one playing session to the next.

Optionally, in an alternative embodiment, one or more of the primary games may trigger a bonus or secondary game. The bonus game is separate and distinct from the multiple primary games offered on the gaming machine 10. Additionally, the bonus game state information may be saved and utilized at a later time as disclosed in pending application Ser. No. 10/171,267, entitled "System and Method for Enhancing Game Play with Non-Credit Game Awards," filed Jun. 11, 2002, which is hereby incorporated by reference.

In an optional embodiment, at least one of the primary games is a horse race type game. In one example, the game simulates a horse race and the player bets on a horse to win. Optionally, in alternate embodiments, the player may additionally bet on a horse to place and a horse to show. In one embodiment, the simulated game is displayed on a video screen. Once the player places his bet the game is activated and an outcome is displayed on the video screen. Optionally, in alternate embodiment, the player must pull a handle or push a button to trigger activation of the game. Additionally, in optional embodiments, the horse race game includes multiplier effects, wherein a "winning horse" may include some type of multiplier to increase the payout award.

In another embodiment, the gaming machine provides one or more primary games that utilize one or more devices during game play. For example, referring to FIG. 1, the gaming machine 10 comprises multiple devices such as the reels 45, the wheel 23 and the display 20. In one example embodiment, a first primary game may use the wheel 23 and one or more of the reels 45 during play of the first primary game. Additionally, a second primary game, different from the first primary game, may use only the wheel 23 or the reels 45 during game play. Optionally, a primary game may use, in combination, the wheel 23 and the display 20 during game play. Similarly, a different primary game may use, in combination, one or more of the reels 45 and the display 20 during game play. Those skilled in the art will appreciate that any combination of devices may be used during game play.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for remapping a wheel, the method comprising:

providing a wagering game upon a gaming machine comprising a wheel divided into a plurality of wheel segments each having a generally wedge shape;

receiving a player wager;

prior to play of every game, a processor randomly selecting one weighted map from a library stored in memory including a plurality of weighted maps based on player information before producing a game outcome, wherein each weighted map in the library defines particular weights for the wheel segments on the wheel, and wherein any weighted map is applicable to a higher rated player and a limited number of weighted maps are applicable to a lower rated player;

assigning particular weights to the wheel segments as defined by the selected weighted map, wherein the particular weights are assigned to the wheel segments before a game outcome is produced;

indicating to the player which weighted map is being applied to the wheel segments upon a display of the gaming machine; and receiving player input initiating game play.

2. The method of claim 1, further comprising providing one or more different games for play on the same wheel, wherein each of the different games is associated with a particular map.

3. The method of claim 2, further comprising:

selecting a game for play on the wheel; and selecting the particular map associated with the selected game.

4. The method of claim 1, further comprising providing one or more additional wagering games.

5. The method of claim 1, further comprising receiving a player wager, wherein the amount of the player wager determines which map is selected.

6. The method of claim 1, further comprising receiving player input, wherein the player input determines which map is selected.

7. The method of claim 1, further comprising receiving information from a player identification device, wherein the received information determines which map is selected.

8. The method of claim 1, further comprising presenting the wheel for play in a bonus game.

9. The method of claim 1, further comprising presenting the wheel for play in a primary game.

10. The method of claim 1, further comprising presenting the wheel for use in a system-based game.

11. A method for remapping a wheel, the method comprising:

providing a wagering game upon a gaming machine comprising a wheel divided into a plurality of wheel segments each having a generally wedge shape;

receiving player information;

a processor selecting one weighted map from a library stored in memory including a plurality of weighted maps based on the player information, wherein each weighted map of the library defines particular weights for the wheel segments on the wheel, and wherein any weighted map is applicable to a higher rated player and a limited number of weighted maps are applicable to a lower rated player;

assigning particular weights to the wheel segments as defined by the selected weighted map, wherein the particular weights are assigned to the wheel segments before game outcome is produced;

indicating to the player on a display of the gaming machine which weighted map is being applied to the wheel segments; and initiating game play in response to player input.

12. The method of claim 11, wherein player information is player rating information.

13. The method of claim 11, wherein player information is the player's rate of play.

* * * * *

UNITED STATES PATENT AND TRADEMARK OFFICE

CERTIFICATE OF CORRECTION

PATENT NO. : 8,414,381 B2
APPLICATION NO. : 11/559354
DATED : April 9, 2013
INVENTOR(S) : Marvin A. Hein et al.

It is certified that error appears in the above-identified patent and that said Letters Patent is hereby corrected as shown below:

In the Specifications:

Column 1, In line 26, change “application” to --Application--

Column 2, In line 12, add --S-- to “DRAWING”

Column 6, In line 39, change “172” to --1172--

Column 17, In line 4, change “optionally” to --optional--

Column 19, In line 7, change “additionally” to --additional--

Column 19, In line 10, change “sports” to --sports’--

Signed and Sealed this
Sixteenth Day of July, 2013

Teresa Stanek Rea
*Acting Director of the United States Patent and Trademark Office*